US012500332B2

(12) United States Patent
Anguera Pros et al.

(10) Patent No.: US 12,500,332 B2
(45) **Date of Patent: *Dec. 16, 2025**

(54) SLIM BOOSTER BARS FOR ELECTRONIC DEVICES

(71) Applicant: IGNION, S.L., Barcelona (ES)

(72) Inventors: Jaume Anguera Pros, Vinaros (ES); Norman Toporcer, Castelldefels (ES); Aurora Andujar Linares, Barcelona (ES)

(73) Assignee: IGNION, S.L., Barcelona (ES)

(*) Notice: Subject to any disclaimer, the term of this patent is extended or adjusted under 35 U.S.C. 154(b) by 0 days.

This patent is subject to a terminal disclaimer.

(21) Appl. No.: 18/734,703

(22) Filed: Jun. 5, 2024

(65) Prior Publication Data

US 2024/0405406 A1 Dec. 5, 2024

Related U.S. Application Data

(63) Continuation of application No. 18/454,180, filed on Aug. 23, 2023, now abandoned, which is a (Continued)

(30) Foreign Application Priority Data

Jul. 24, 2014 (EP) .................................... 14178369
Oct. 16, 2014 (EP) .................................... 14189253

(Continued)

(51) Int. Cl.
*H01Q 1/24* (2006.01)
*H01Q 1/38* (2006.01)

(Continued)

(52) U.S. Cl.
CPC ............... *H01Q 1/243* (2013.01); *H01Q 1/38* (2013.01); *H01Q 5/335* (2015.01); *H01Q 5/357* (2015.01);

(Continued)

(58) Field of Classification Search
CPC ............ H01Q 1/243; H01Q 1/38; H01Q 1/50; H01Q 5/335; H01Q 5/357; H01Q 5/50; H01Q 9/0485; H01Q 9/40; H01Q 21/30
See application file for complete search history.

(56) References Cited

U.S. PATENT DOCUMENTS 5,644,319 A * 7/1997 Chen ...................... H01Q 1/243 343/702
5,943,025 A 8/1999 Benham (Continued)

FOREIGN PATENT DOCUMENTS

CN 101750541 A 6/2010
EP 0823748 A1 2/1998

(Continued)

OTHER PUBLICATIONS

Lopez , N. et al, Compact metamaterial antenna array for long term evolution (LTE) handset application, International Workshop on Antenna Technology (IWAT), 2009. IEEE, Mar. 2, 2009.

(Continued)

*Primary Examiner* — Awat M Salih

(74) *Attorney, Agent, or Firm* — Edell, Shapiro & Finnan, LLC

(57) ABSTRACT

A wireless device includes at least one slim radiating system having a slim radiating structure and a radio-frequency system. The slim radiating structure includes one or more booster bars. The booster bar has slim width and height factors that facilitate its integration within the wireless device and the excitation of a resonant mode in the ground plane layer, and has a location factor that enables it to achieve the most favorable radio-frequency performance for the available space to allocate the booster bar. The at least one slim radiating system may be configured to transmit and (Continued)

receive electromagnetic wave signals in one or more frequency regions of the electromagnetic spectrum.

19 Claims, 20 Drawing Sheets

Related U.S. Application Data continuation of application No. 17/701,247, filed on Mar. 22, 2022, now abandoned, which is a continuation of application No. 16/274,013, filed on Feb. 12, 2019, now Pat. No. 11,349,195, which is a continuation of application No. 15/875,817, filed on Jan. 19, 2018, now Pat. No. 10,236,561, which is a continuation of application No. 14/807,449, filed on Jul. 23, 2015, now Pat. No. 9,960,478.

(60) Provisional application No. 62/152,991, filed on Apr. 27, 2015, provisional application No. 62/072,671, filed on Oct. 30, 2014, provisional application No. 62/064,716, filed on Oct. 16, 2014, provisional application No. 62/028,494, filed on Jul. 24, 2014.

(30) Foreign Application Priority Data

Oct. 30, 2014 (EP) .................................... 14191145
Apr. 27, 2015 (EP) .................................... 15165167

(51) Int. Cl.

| | |
|---|---|
| ***H01Q 5/335*** | (2015.01) |
| ***H01Q 5/357*** | (2015.01) |
| ***H01Q 5/50*** | (2015.01) |
| ***H01Q 9/04*** | (2006.01) |
| ***H01Q 9/40*** | (2006.01) |
| ***H01Q 21/30*** | (2006.01) |
| *H01Q 1/50* | (2006.01) |

(52) U.S. Cl.
CPC ............. *H01Q 5/50* (2015.01); *H01Q 9/0485* (2013.01); *H01Q 9/40* (2013.01); *H01Q 21/30* (2013.01); *H01Q 1/50* (2013.01)

(56) References Cited

U.S. PATENT DOCUMENTS 5,990,838 A 11/1999 Burns
6,008,774 A 12/1999 Wu
6,259,407 B1 7/2001 Tran
6,307,525 B1 10/2001 Bateman
6,421,016 B1 7/2002 Phillips
6,424,300 B1 7/2002 Sanford
6,674,411 B2 1/2004 Boyle
6,791,498 B2 9/2004 Boyle
7,023,909 B1 4/2006 Adams
7,079,077 B2 7/2006 Lee
7,274,340 B2 9/2007 Ozden
7,345,634 B2 3/2008 Ozcar et al.
7,405,698 B2 7/2008 De Rochemont
7,421,321 B2 9/2008 Breed
7,760,146 B2 7/2010 Ollikainen
7,764,232 B2 * 7/2010 Achour .............. H01Q 15/0086 343/909
7,764,236 B2 7/2010 Hill
7,764,323 B2 7/2010 Choi et al.
8,237,615 B2 8/2012 Anguera et al.
8,253,633 B2 8/2012 Sanz et al.
8,427,373 B2 4/2013 Jiang et al.
8,472,908 B2 6/2013 Anguera et al.
8,738,103 B2 5/2014 Puente Baliarda et al.
9,099,773 B2 8/2015 Puente Baliarda et al.
9,240,632 B2 1/2016 Puente Baliarda et al.
9,331,389 B2 5/2016 Anguera et al.
9,960,478 B2 5/2018 Anguera Pros et al.
11,349,195 B2 5/2022 Anguera Pros et al.
2001/0015705 A1 8/2001 Scordilis
2002/0177416 A1 11/2002 Boyle et al.
2003/0063036 A1 4/2003 Sato et al.
2003/0098757 A1 5/2003 Iwamoto et al.
2004/0227683 A1 11/2004 Caimi et al.
2004/0263401 A1 * 12/2004 Ikuta .................... H01Q 9/0442 343/702
2005/0041624 A1 2/2005 Hui
2005/0237251 A1 10/2005 Boyle
2006/0214856 A1 9/2006 Nakano et al.
2007/0146212 A1 6/2007 Ozden et al.
2008/0018543 A1 1/2008 Baliarda et al.
2008/0122717 A1 5/2008 Ishihara et al.
2008/0136716 A1 6/2008 Annamaa
2008/0252536 A1 10/2008 Anguera et al.
2009/0156151 A1 6/2009 Anguera et al.
2009/0243943 A1 10/2009 Mumbru et al.
2010/0109955 A1 5/2010 Anguera et al.
2010/0123630 A1 5/2010 Chou
2010/0176999 A1 7/2010 Anguera et al.
2010/0188300 A1 7/2010 Anguera et al.
2011/0095948 A1 4/2011 Alexopoulos et al.
2011/0117976 A1 5/2011 Nishikido et al.
2011/0175776 A1 7/2011 Anguera et al.
2011/0248891 A1 * 10/2011 Han ......................... H01Q 1/40 343/700 MS
2012/0299786 A1 * 11/2012 Anguera .................. H01Q 1/48 343/702
2013/0187824 A1 7/2013 Kato et al.
2014/0015728 A1 * 1/2014 Anguera Pros ...... H01Q 9/0414 343/843
2014/0015730 A1 1/2014 Anguera Pros et al.
2014/0091880 A1 * 4/2014 Dupuy ...................... H01P 3/02 333/136
2014/0253395 A1 9/2014 Puente Baliarda et al.
2014/0300518 A1 10/2014 Ramachandran et al.
2014/0375426 A1 * 12/2014 Nero, Jr. .................. H01Q 1/36 29/601
2015/0357989 A1 12/2015 Ma et al.
2017/0317406 A1 * 11/2017 Anguera Pros ........ H01Q 1/245

FOREIGN PATENT DOCUMENTS

EP 0856907 A1 8/1998
EP 1154516 A1 12/1999
EP 1011167 A1 6/2000
EP 1458108 A1 9/2004
EP 1569300 A1 8/2005
EP 1672733 A1 6/2006
EP 1703586 A1 9/2006
EP 1791213 A1 5/2007
JP 2002223114 A 8/2002
JP 2005175846 A 6/2005
JP 2006279159 A 10/2006
JP 2010081098 A 4/2010
WO 9627219 A1 9/1996
WO 9706578 A1 2/1997
WO 9711507 A1 3/1997
WO 9944257 A1 9/1999
WO 02063712 A1 8/2002
WO 02095869 A1 11/2002
WO 2004025778 A1 3/2004
WO 2004027922 A1 4/2004
WO 2004066439 A1 8/2004
WO 2005093901 A1 10/2005
WO 2007074369 A1 7/2007
WO 2007128340 A1 11/2007
WO 2008009391 A1 1/2008
WO 2008119699 A1 10/2008
WO 2009027579 A1 3/2009
WO 2010015364 A1 2/2010
WO 2010015365 A1 2/2010

(56) References Cited

FOREIGN PATENT DOCUMENTS

| | | | |
|---|---|---|---|
| WO | 2012017013 | A1 | 2/2012 |
| WO | 2014012796 | A1 | 1/2014 |
| WO | 2014012842 | A1 | 1/2014 |

OTHER PUBLICATIONS

Luk, K. M., and B. Wu, "The Magnetoelectric Dipole V A Wideband Antenna for Base Stations in Mobile Communications", Proceedings of the IEEE, vol. 100(7), pp. 2297-2307, 2012.
Martinez-Vazquez , M., Design of antennas for mobile communications devices: practical aspects, Antennas and Propagation Society (APS), 2011. IEEE International Symposium, Aug. 1, 2011.
Mehdipour , A. et al., Reinforced continuous carbon-fiber composites using multi-wall carbon nanotubes for wideband antenna Applications, Transactions on Antennas and Propagation, IEEE, Apr. 26, 2010, vol. 58, No. 7.
Nakar , P. S., Design of a compact microstrip patch antenna for use in wireless/cellular devices, The Florida State University. College of Engineering, Mar. 4, 2004.
Öjefors , E., Integrated antennas, Uppsala Universitet, Jan. 1, 2006, p. 5-69.
Pablos , J.P.; Molina, F., Techniques to reduce the mutual coupling and to improve the isolation between Antennas in a diversity System, Aalborg University, Jan. 6, 2010.
Peixeiro, C. et al., Antenna feasibility study on the printed antenna elements and the multiple input multiple output (MIMO) antenna topologies to be used in Flow mobile terminals, FLOWS project, Nov. 18, 2002.
Perez , D., Antenna design multiband mobile parasitics, Universitat Ramon Llull (URL). La Salle, Jan. 1, 2006.
Picher , C. ; Anguera , J. ; Bujalane , A. ; Andujar , A. ; Puente , C., Analysis of a multiband monopole handset antenna combined with a slotted ground plane, Microwave and Optical Technology Letters, Jan. 1, 2013, vol. 55, No. 1.
Picher , C., Improved sensitivity and incorporation of FM services in mobile telephony antennas, Universitat Ramon Llull—La Salle, Sep. 1, 2009.
Poularikas , A., Handbook of antennas in wireless communications—Chapter 11—Outdoor and indoor cellular/personal handy phone system base station antenna in Japan, CRC, Jan. 1, 2002.
Poularikas , A., Handbook of antennas in wireless Communications, CRC Press, Jan. 1, 2002.
Professional antennas & filters for mobile communications 30-521 MHz, Kathrein, Jan. 1, 2008.
Qorvo White Paper, "Overcoming the RF Challenges of Full-Screen Smartphones", www.qorvo.com, pp. 1-7, Feb. 2018.
Rao , Q. ; Wang , D., A compact dual-port diversity antenna for long-term evolution handheld devices, 71th Conference Vehicular Technology (VTC), IEEE, Mar. 1, 2010, vol. 59, No. 3.
Rowell , C. ; Lam, E., Mobile-phone antenna designAntennas and Propagation Magazine, IEEE, Aug. 1, 2012, vol. 54, No. 4.
Sidhwani , R., Antenna tuning for WCDMA RF front end, Aalto University. School of Electrical Engineering, Nov. 20, 2012.
Smith , G. S., Efficiency of electrically small antennas combined with matching networks, Transactions on Antennas and Propagation, IEEE, May 1, 1977.
Soler , J., Novel multifrequency and small monopole antenna techniques for wireless and mobile Applications, Universitat Politecnica de Catalunya (UPC), Dec. 1, 2004.
Tamagnone , M. et al., High-impedance frequency-agile THz dipole antennas using Graphene, 7th European Conference on Antennas and Propagation (EUCAP), Apr. 1, 2013.
Tanaka , M. et al., Wearable microstrip antena, Antennas and Propagation Society (APS), 2003. IEEE International Symposium, Jun. 22, 2003.
The impact of Sarsys on standardization for handheld phone certification, Sarsys Project, Jan. 1, 2001.
Toporcer , N., Design and performance assessment of ground plane boosters with a bar form factor, Universitat Politecnica de Catalunya ; Fractus, Nov. 24, 2014.
Valkonen , R., Impedance matching and tuning of non-resonant mobile terminals antennas, Aalto University, Mar. 15, 2013.
Villanen , J. et al., Coupling element based mobile terminal antenna structures, Transactions on Antennas and Propagation, IEEE, Jul. 1, 2006.
Villanen , J., Miniaturization and evaluation methods of mobile terminal antenna structures, Helsinki University of Technology. Radio Laboratory Publications, Sep. 3, 2007.
Wahidi, A. J., Design and optimization of multiple printed inverted-f antennas (PIFAs) on a semi-populated mobile handset, Universite de Montreal, Aug. 1, 2012.
Wang , Y. J. et al., Design of small and broad-band internal antennas for IMT-2000 mobile handsets, Transactions on Microwave Theory and Techniques, IEEE, Aug. 1, 2001, vol. 49, No. 8.
Wong , K. L. ; SU , W. C. ; Chang , F. S., Wideband internal folded planar monopole antenna for UMTS/WiMax folder-type mobile phone, Microwave and Optical Technology Letters, Feb. 2, 2006, vol. 48.
Wong , K. L., Compact and broadband microstrip antennas, John Wiley and Sons Inc, Jan. 1, 2002.
Wong , K. L., Planar antennas for wireless communications_Full, Wiley Interscience, Jan. 1, 2003.
Xu , Z. ; Dong , X. ; Bornemann , J., Design of a reconfigurable MIMO system for THz communications based on graphene antennas, IEEE Transactions on Terahertz Science and Technology, Jun. 30, 2014, vol. 4, No. 5.
Yang , CH. et al., Novel compact multiband MIMO antenna for mobile terminal, International Journal of Antennas and Propagation, Jan. 1, 2012, vol. 2012.
Yang , S. et al., Frequency-reconfigurable antennas for multiradio wireless platforms, Microwave Magazine, IEEE, Feb. 1, 2009.
Andujar , A. ; Anguera, J., MIMO multiband antenna system combining resonant and nonresonant elements, Microwave and optical technology letters, May 1, 2014, vol. 56, No. 5.
Andujar , A., Ground plane booster antenna technology for wireless handheld devices, Universitat Politecnica de Catalunya—Fractus, May 1, 2013.
Andujar, A. ; Puente , C. ; Anguera, J. ; Dasquens , A. ; Cobo , Y. ; Portabella , J., Virtual antenna technology: the flexible and off-the-shelf mobile antenna solution, Fractus, Nov. 27, 2013.
Anguera , J. ; Andujar , J. ; Huynh , M. C. ; Orlenius , C. ; Picher , C. ; Puente , C., Advances in Antenna Technology for Wireless Handheld Devices, International Journal on Antennas and Propagation, Jan. 1, 2013, vol. 2013.
Anguera , J. ; Pérez , A., Teoria de Antenas, La Salle, Sep. 1, 2011.
Anguera , J. Et al, Advances in antenna technology for wireless handheld devices, Hindawi, Jan. 1, 2013.
Angwafo , N., Towards conformal antennas for miniaturized autarchic distributed Systems, Technischen Univesitat Berlin. Elektrotechnik und informatik, Jun. 2, 2006.
Arenas , J. J., Analysis and design of differential for wireless antennas, Universitat Politecnica de Catalunya (UPC), Jan. 1, 2008.
Bedair , A. ; Abdel-Mooty Abdel-Rahman , A. B., Design and development of high gain wideband microstrip antenna and DGS filters using numerical experimentation approach, Universitat Magdeburg. Fakultat Elektrotechnik und Informationstechnik der Otto-von-Guericke—, Jun. 1, 2005.
Behdad , N. et al., Slot antenna design for wireless communications Systems, 2nd European Conference on Antennas and Propagation (EUCAP), Nov. 8, 2007.
Bujalance, A., Arquitecturas compactas y multibanda con tecnología de antena Ground Plane Booster, Universitat Ramon Llull-La Salle, 2014.
Bujalance , A., Monopole antennas with intelligent ground plane for smart mobile devices—Antenas monopolo con plano de masa inteligente para dispositivos de telefonia movil, Universitat Politecnica de Barcelona (UPC), Jan. 1, 2011.
Cabedo , A., Antenas multiband para aplicaciones 2G, 3G, WIFI, WLAN y bluetooth en terminales móviles de nueva generación—

(56) References Cited

OTHER PUBLICATIONS

Multi-band antenna applications for 2G, 3G, WIFI, WLAN, bluetooth in next-generation mobile terminals, Universitat Ramon Llull, Oct. 1, 2006.
Cabedo Fabres , M., Systematic design of antennas using the theory of characteristic modes, Universitat Politecnica de Valencia, Feb. 1, 2007.
Chan , S. P., The electrical engineering handbook, Boca Raton CRC Press, Jan. 14, 2000.
Chandra Karmakar , N., Shorting strap tunable stacked patch PIFA, Transactions on Antennas and Propagation, IEEE, Nov. 1, 2004, vol. 52, No. 11.
Chen, Z. N. (ed.), Antennas for portable devices, John Wiley & Sons, 2007, pp. 20, 30.
Cobo , Y., MIMO system combining a PIFA antenna and ground plane booster antenna Technology, La Salle (URL), Jun. 1, 2014.
Conway , G. A. ; Scanlon , W. G., Antennas for Over-Body-Surface Communication at 2.45 GHz, Transactions on Antennas and Propagation, IEEE, Apr. 1, 2009, vol. 57, No. 4.
Cummings , N. P., Low profile integrated GPS and cellular antena, Virginia Polytechnic Institute and State University, Oct. 31, 2001.
Design guide for wireless antenna systems including: Bluetooth and 802.11 applications, Centurion Wireless Technologies, Dec. 1, 2000.
Diaz , V., Multiband MIMO techniques for handset devices based on ground plane boosters, Universitat Ramon Llull (URL)—La Salle, Dec. 13, 2012.
Dietrich , C. B. et al, Trends in antennas for wireless Communications, Microwave Journal, Mar. 18, 2003.
Duroc , Y. ; Najam , A.I., Ultra Wideband—Chapter 16—UWB antennas: design and modeling, InTech—http://www.intechopen.com, Sep. 1, 2010, pp. 371-398.
FLOWS project—Antenna feasibility study on the printed antenna elements and the multiple input multiple output ( MIMO ) antenna topologies to be used in Flow mobile terminals, FLOWS project, Nov. 18, 2002.
Fujimoto, K., Antennas for mobile communications, Encyclopedia of RF and Microwave Engineering, John Wiley & Sons, 2005, pp. 360, 361.
Garcia Martos , C., Analysis and design of planar antennas Thumbnail-multiband wireless platform—Analisis y diseño de antenas miniatura multibanda planares para plataformas wireless, Universitat Ramon Llull—La Salle, Jan. 1, 2012.
Gobien , A. T., Investigation of low profile antenna designs for use in hand-held radios—Master of Science, Virginia Polytechnic Institute and State University, Aug. 1, 2007.
Golio, Mike, The RF and microwave handbook, CRC, Jan. 3, 2000, 1376 p.
Gongora , S., Compact architectures of ground plane boosters for laptop and smartphones platforms : Analisis y diseño de arquitecturas compactas de ground-plane booster para plataformas smartphone y laptop, Universitat Ramon Llull—La Salle, Jan. 1, 2012.
Gonzalez Claramonte , L., Caracterización de antenas en medios materiales y su interacción con la cabeza humana, Universitat Politecnica de Catalunya (UPC), Jun. 1, 2008.
Gonzalez Claramonte , L., Characterization of antenna in media materials and their interaction with human head, Universitat Politecnica de Catalunya (UPC), Jun. 1, 2008.
Griffin , D. W. ; Parfitt , A. J., Electromagnetic design aspect of packages for monolithic microwave integrated circuit based arrays with integrated antenna elements, Transactions on Antennas and Propagation, IEEE, Sep. 1, 1995, vol. 43, No. 9.
Hallberg , L., Tunable WWAN/LTE handset antenna and its LTE MIMO application, Chalmers University of Technology, Jan. 1, 2012.
Holopainen , J., Antenna for handheld DVB terminal—Full, Helsinki University of Technology, May 17, 2005.
Huang , J. T. ; Shiao , J. H. ; Wu , J. M., A miniaturized Hilbert inverted-F antenna for wireless sensor network Applications, Transactions on Antennas and Propagation, IEEE, Jun. 13, 2010, vol. 58, No. 9.
Huynh , M. C., A numerical and experimental investigation of planar inverted-F antennas for wireless communication Applications, Virginia Polytechnic Institute and State UniversityOct. 19, 2000.
Ikonen , P., Artificial electromagnetic composite structures in selected microwave Applications, Helsinki University of Technology, Mar. 1, 2007.
Ilvonen , J. ; Valkonen , R. ; Holopainen , J. ; Viikari , V., Design strategy for 4G handset antennas and a multiband hybrid antena, IEEE Transactions on Antennas and Propagation , Jan. 1, 2014, pp. 1918-1927, vol. 62, No. 4.
Iyer, V. et al., “A Lumped Circuit for Wideband Impedance Matching of a Non-Resonant, Short Dipole or Monopole Antenna”, IEEE Antennas and Propagation Society International Symposium, Jul. 2009, IEEE Antennas and Propagation, vol. 28(1): 18-26 (Jan. 2010).
James Causley , A., Design of conformal antennas for telephone handsets, The University of Queensland, Jan. 1, 2002.
Kearney , D. et al, Miniature ceramic dual-PIFA antenna to support band group 1 UWB functionality in mobile handset, Transactions on Antennas and Propagation, IEEE, Nov. 1, 2010, vol. 59, No. 1.
Kildal , P. S. ; Luxey , C. ; Skrivervik, A. K. et al, Report on the state of the art in small terminal antennas: Technologies, requirements and standards, ACE (Antenna Centre of Excellence), Dec. 31, 2004, 120p.
Kildal, P.S., et al., “Report on the state of the Art in Small Terminal Antennas: Technologies, Requirements and Standards”, ACE, 2004.
Kivekas , O. et al., Design of high-efficiency antennas for mobile communications devices, Helsinki University of Technology, Aug. 1, 2005.
Kuo , J. et al, Dual-frequency operation of a planar inverted-L antenna with tapered patch width, Microwave and Optical Technology Letters, Jan. 20, 2001.
Leiva , J. L., Analysis and design of distributed antenna systems robust to the effects of the hand—Analisis y diseño de sistemas distribuidos de antenas robustos a los efectos de la mano, Universitat Ramon Llull (URL)—La Salle, Jan. 1, 2011.
Lim , K. et al, RF-System-On-Package (SOP) for wireless Communications, Microwave Magazine, IEEE, Mar. 1, 2002.
Lin , Y. C. et al, Compact ultrawideband rectangular aperture antenna and band-notched designs, Transactions on Antennas and Propagation, IEEE, Nov. 1, 2006.
Lindberg , P. et al., Wideband active and passive antenna solutions for handheld terminals, Uppsala Universitet. Acta Universitatis Upsaliensis, Jan. 1, 2007.
Ollikainen , J. et al., Design and implementation techniques of wideband mobile communications antennas, Helsinki University of Technology, Nov. 1, 2004.
Chu L. J., “Physical limitations of omni-directional antennas”, Journal of applied physics, vol. 19, No. 12, Dec. 1948, pp. 1163-1175.
Wheeler, H.A., “Fundamental Limitations of Small Antennas”, Proceedings of the IRE, vol. 35, No. 12, Dec. 1947, pp. 1479-1484.
Hansen R. C., “Fundamental limiations in antennas”, Proceedings of the IEEE, vol. 69, No. 2, Feb. 1981, pp. 170-182.

* cited by examiner

SLIM BOOSTER BARS FOR ELECTRONIC DEVICES

CROSS REFERENCE TO RELATED APPLICATIONS

This application is a continuation of U.S. patent application Ser. No. 18/454,180 filed Aug. 23, 2023, which is a continuation of U.S. patent application Ser. No. 17/701,247 filed Mar. 22, 2022, now abandoned, which is a continuation of U.S. patent application Ser. No. 16/274,013 filed Feb. 12, 2019, issued as U.S. Pat. No. 11,349,195 on May 31, 2022, which is a continuation of U.S. patent application Ser. No. 15/875,817 filed Jan. 19, 2018, issued as U.S. Pat. No. 10,236,561 on Mar. 19, 2019, which is a continuation of U.S. patent application Ser. No. 14/807,449 filed Jul. 23, 2015, issued as U.S. Pat. No. 9,960,478, on May 1, 2018, which claims priority under 35 U.S.C. § 119 (c) from U.S. Provisional Patent Application Ser. No. 62/028,494, filed Jul. 24, 2014, U.S. Provisional Patent Application Ser. No. 62/064,716, filed Oct. 16, 2014, U.S. Provisional Patent Application Ser. No. 62/072,671, filed Oct. 30, 2014, and U.S. Provisional Patent Application Ser. No. 62/152,991, filed Apr. 27, 2015, the entire contents of which are hereby incorporated by reference. In addition, this application claims foreign priority under 35 U.S.C. § 119 (a)-(d) to Application No. EP 14178369.6 filed on Jul. 24, 2014, Application No. EP 14189253.9 filed on Oct. 16, 2014, Application No. EP 14191145.3 filed on Oct. 30, 3014, and Application No. EP 15165167.6 filed on Apr. 27, 2015, the entire contents of which are hereby incorporated by reference.

STATEMENT OF RESEARCH FUNDING

This patent application is part of a project that has received funding from the European Union's Horizon 2020 Research and Innovation Programme under grant agreement No. 674491.

FIELD OF THE INVENTION

The present invention relates generally to the field of electronic devices which require the transmission and/or reception of electromagnetic wave signals, and more particularly, to slim radiating structures in wireless electronic devices.

BACKGROUND

Wireless electronic devices typically handle one or more cellular communication standards, and/or wireless connectivity standards, and/or broadcast standards, each standard being allocated in one or more frequency bands, and the frequency bands being contained within one or more regions of the electromagnetic spectrum.

For that purpose, a typical wireless electronic device must include a radiating system capable of operating in one or more frequency regions with an acceptable radio-electric performance (in terms of for instance reflection coefficient, standing wave ratio, impedance bandwidth, gain, efficiency, or radiation pattern). The integration of the radiating system within the wireless electronic device must be effective to ensure that the overall device attains good radio-electric performance (such as for example in terms of radiated power, received power, sensitivity) without being disrupted by electronic components and/or human loading.

Additionally, a space within the wireless electronic device is usually limited and the radiating system has to be included in the available space. The radiating system is expected to be small enough to occupy as little space as possible within the device, which then allows for smaller devices, or for the addition of more specific components and functionalities into the device. At the same time, it is sometimes convenient for the radiating system to be flat since this allows for slim devices. Thus, many of the demands for wireless devices also translate to specific demands for the radiating systems thereof. This is even more critical in the case in which the wireless device is a multifunctional wireless device. Commonly-owned patent applications WO2008/009391 and US2008/0018543 describe a multifunctional wireless device. The entire disclosure of aforesaid application numbers WO2008/009391 and US2008/0018543 are hereby incorporated by reference.

For a good wireless connection, high efficiency is further required. Other more common design demands for radiating systems are the reflection coefficient (or standing-wave ratio, SWR) and the impedance which is supposed to be about 50 ohms. Other demands for radiating systems for wireless handheld or portable devices are competitive cost and a low SAR.

Furthermore, a radiating system has to be integrated into a device or, in other words, a wireless device has to be constructed such that an appropriate radiating system may be integrated therein which puts additional constraints by consideration of the mechanical fit, the electrical fit, and the assembly fit.

Of further importance, usually, is the robustness of the radiating system, which means that the radiating system does not change its properties upon smaller shocks to the device and the human loading.

Besides radio-frequency performance, small size and reduced interaction with human body and nearby electronic components, one of the current limitations of the prior-art is that generally the antenna system is customized for every particular wireless handheld device model. The mechanical architecture of each device model is different and the volume available for the antenna severely depends on the form factor of the wireless device model together with the arrangement of the multiple components embedded into the device (e.g., displays, keyboards, battery, connectors, cameras, flashes, speakers, chipsets, memory devices, etc.). As a result, the antenna within the device is mostly designed ad hoc for every model, resulting in a higher cost and a delayed time to market. In turn, as typically the design and integration of an antenna element for a radiating structure is customized for each wireless device, different form factors or platforms, or a different distribution of the functional blocks of the device will force to redesign the antenna element and its integration inside the device almost from scratch.

A radiating system for a wireless handheld or portable device typically includes a radiating structure comprising an antenna element which operates in combination with a ground plane layer providing a determined radio-frequency performance in one or more frequency regions of the electromagnetic spectrum. Typically, the antenna element has a dimension close to an integer multiple of a quarter of the wavelength at a frequency of operation of the radiating structure, so that the antenna element is at resonance or substantially close to resonance at the frequency of operation, and a radiation mode is excited on the antenna element.

Antenna elements operating in multiple frequency bands allocated at different regions of the electromagnetic spectrum usually present complex mechanical designs and considerable dimensions, mainly due to the fact that antenna performance is highly related to the electrical dimensions of the antenna element.

A further problem associated to the integration of the radiating structure, and in particular to the integration of the antenna element in a wireless device is that the volume dedicated for such integration has continuously shrunk with the appearance of new smaller and/or thinner form factors for wireless devices, and with the increasing convergence of different functionalities in a same wireless device. Therefore, from the conventional wisdom perspective, the trend in seeking for slimmer wireless device is incompatible with maximizing the performance of a traditional antenna device, which again, it is known to have a high correlation between antenna size (relative to the operating wavelengths) and performance.

Some techniques to miniaturize and/or optimize the multiband behavior of an antenna element have been described in the prior art. However the radiating structures described therein still rely on exciting a radiation mode on the antenna element for each one of the frequency bands of operation. This fact leads to complex mechanical designs and large antennas that usually are very sensitive to external effects (such as for instance the presence of plastic or dielectric covers that surround the wireless device), to components of the wireless device (such as for instance, but not limited to, a speaker, a microphone, a connector, a display, a shield can, a vibrating module, a battery, or an electronic module or subsystem) placed either in the vicinity of, or even underneath, the radiating element, and/or to the human loading. A multiband antenna system is sensitive to any of the above mentioned aspects because they may alter the electromagnetic coupling between the different geometrical portions of the radiating element, which usually translates into detuning effects, degradation of the radio-frequency performance of the antenna system and/or the radio-frequency performance of the wireless device, and/or greater interaction with the user (such as an increased level of SAR).

In this sense, a radiating system such as the one described in the present invention not requiring a complex and/or large antenna formed by multiple arms, slots, apertures and/or openings and a complex mechanical design is preferable in order to minimize such undesired external effects and simplify the integration within the wireless device.

Some other attempts have focused on antenna elements not requiring a complex geometry while still providing some degree of miniaturization by using an antenna element that is not resonant in the one or more frequency ranges of operation of the wireless device.

For example, WO2007/128340 discloses a wireless portable device comprising a non-resonant antenna element for receiving broadcast signals (such as, for instance, DVB-H, DMB, T-DMB or FM). The wireless portable device further comprises a ground plane layer that is used in combination with said antenna element. Although the antenna element has a first resonant frequency above the frequency range of operation of the wireless device, the antenna element is still the main responsible for the radiation process and for the radio-frequency performance of the wireless device. This is clear from the fact that no radiation mode can be excited on the ground plane layer because the ground plane layer is electrically short at the frequencies of operation (i.e., its dimensions are much smaller than the wavelength). For this kind of non-resonant antenna elements, a matching circuitry is added for matching the antenna to a level of SWR in a limited frequency range, which in this particular case can be around SWR≤6. Such level of SWR together with the limited bandwidth results in antenna elements which are only acceptable for reception of electromagnetic wave signals but not desirable for transmission of electromagnetic wave signals. With such limitations, while the performance of the wireless portable device may be sufficient for reception of electromagnetic wave signals (such as those of a broadcast service), the antenna element could not provide an acceptable performance (for example, in terms of reflection coefficient or gain) for a communication service requiring also the transmission of electromagnetic wave signals.

Commonly-owned patent applications WO2008/119699 and US2010/0109955 describe a wireless handheld or portable device comprising a radiating system capable of operating in two frequency regions. The radiating system comprises an antenna element having a resonant frequency outside said two frequency regions, and a ground plane layer. In this wireless device, while the ground plane layer contributes to enhance the electromagnetic performance of the radiating system in the two frequency regions of operation, it is still necessary to excite a radiation mode on the antenna element. In fact, the radiating system relies on the relationship between a resonant frequency of the antenna element and a resonant frequency of the ground plane layer in order for the radiating system to operate properly in said two frequency regions. Nevertheless, the solution still relies on an antenna element whose size is related to a resonant frequency that is outside of the two frequency regions. The entire disclosures of the aforesaid application numbers WO2008/119699 and US2010/0109955 are hereby incorporated by reference.

A different radiating system is disclosed in U.S. Pat. No. 6,674,411, in which a planar inverted-L antenna (i.e., a patch antenna) has a radiating element composed by a rectangular plate placed above and substantially parallel to a ground plane. The antenna is connected to a matching network that provides a match in one frequency band in a first frequency region, and in one frequency band in a second frequency region. Thus the antenna system is limited to single-band operation in both frequency regions. When operation in more bands is sought, the antenna system requires of a switched (active) matching network that provides non-simultaneous impedance matching in each frequency band. So in spite of having an antenna that occupies a large volume (20×10×8 mm3), not more than dual-band operation may be provided simultaneously.

For at least the above reasons, wireless device manufacturers regard the volume dedicated to the integration of the radiating structure, and in particular the antenna element, as being a toll to pay in order to provide wireless communication capabilities to the handheld or portable device.

In order to reduce as much as possible the volume occupied into the wireless handheld or portable device, recent trends in handset antenna design are oriented to maximize the contribution of the ground plane to the radiation process by using very small non-resonant elements. However, non-resonant elements usually are forced to include a complex radio-frequency system. Thus, the challenge of these techniques mainly relies on said complexity (combination of inductors, capacitors, and transmission lines), which is required to satisfy impedance bandwidth and efficiency specifications.

Commonly owned patent applications, WO2010/015365, and WO2010/015364 are intended for solving some of the aforementioned drawbacks. Namely, they describe a wireless handheld or portable device comprising a radiating system including a radiating structure and a radio-frequency system. The radiating structure is formed by a ground plane layer presenting suitable dimensions as for supporting at least one efficient radiation mode and at least one radiation booster capable of coupling electromagnetic energy to said ground plane layer. The radiation booster is not resonant in any of the frequency regions of operation and, consequently, a radio-frequency system is used to properly match the radiating structure to the desired frequency bands of operation.

More particularly, in WO2010/015364 each radiation booster is intended for providing operation in a particular frequency region. Thus, the radio-frequency system is designed in such a way that the first internal port associated to the first radiation booster is highly isolated from the second internal port associated to a second radiation booster. Said radio-frequency system usually comprises a matching network including resonators for each one of the frequency regions of operation and a set of filters for each one of the frequency regions of operation. Thus, said radio-frequency system requires multiple stages and the performance of the radiating systems in terms of efficiency may be affected by the additional losses of the components. As each radiation booster is generally intended for providing operation in a particular frequency region, the bandwidth capabilities may be limited for some applications requiring very wide bandwidth specially at the low frequency region, as for example for wireless devices operating at LTE700, GSM850 and GSM900.

Commonly owned patent applications WO2014/012796 and US2014/0015730 disclose a concentrated wireless device comprising a radiating system including a radiating structure and a radio-frequency system, such device operating two or more frequency regions of the electromagnetic spectrum. A feature of said radiating system is that the operation in at least two frequency regions is achieved by one radiation booster, or by at least two radiation boosters, or by at least one radiation booster and at least one antenna element, wherein the radio-frequency system modifies the impedance of the radiating structure, providing impedance matching to the radiating system in the at least two frequency regions of operation of the radiating system. The entire disclosure of aforesaid application numbers WO2014/012796 and US2014/0015730 are hereby incorporated by reference.

Commonly owned patent applications WO2014/012842 and US2014/0015728 disclose very compact, small size and light weight radiation boosters operating in single or in multiple frequency bands. Such radiation boosters are configured to be used in radiating systems that may be embedded into a wireless handheld device. Said patent applications further disclose radiation booster structures and their manufacturing methods that enable reducing the cost of both the booster and the entire wireless device embedding said booster inside the device. The entire disclosure of aforesaid application numbers WO2014/012842 and US2014/0015728 are hereby incorporated by reference.

Another technique, as disclosed in U.S. Pat. No. 7,274,340, is based on the use of two coupling elements. According to the invention, quad-band operation (GSM 1800/1900 and GSM850/900 bands) is provided with two coupling elements: a low-band (LB) coupling element (for the GSM850/900 bands), and a high-band (HB) coupling element (for the GSM1800/1900 bands), where the impedance matching is provided through the addition of two matching circuits, one for the LB coupling element and another one for the HB coupling element. In spite of using non-resonant elements, the size of the element for the low band is significantly large, being 1/9.3 times the free-space wavelength of the lowest frequency for the low frequency band. Due to such size, the low band element would be a resonant element at the high band. Additionally, the operation of this solution is closely linked to the alignment of the maximum E-field intensity of the ground plane and the coupling element. The size of the low band element undesirably contributes to increase the printed circuit board (PCB) space required by the antenna module. According to the invention, the bandwidth at the low frequency region is 133 MHZ (from 821 MHz to 954 MHz) that is insufficient for some applications requiring very wide bandwidth, especially at the low frequency region, as for example for wireless devices operating at LTE700, GSM850 and GSM900.

Therefore, a wireless device not requiring an antenna element and including a slim radiating system would be advantageous to make simpler the integration of the slim radiating structure into the wireless electronic device minimizing the amount of the electronic device that is allocated towards the slim radiating system, and to provide a suitable radio-frequency performance to operate in a wide range of communication bands. The volume freed up by the absence of a large and complex antenna element would enable smaller and/or thinner devices, as slim electronic devices, or even to adopt radically new form factors which are not feasible today due to the presence of an antenna element featuring a considerable volume. Furthermore, by eliminating precisely the element that requires customization, a standard solution is sought which should only require minor adjustments to be implemented in different wireless electronic devices.

SUMMARY

It is an object of the present invention to provide an electronic device (such as for instance but not limited to a mobile phone, a smartphone, a phablet, a PDA, an MP3 player, a headset, a USB dongle, a laptop computer, a tablet, a gaming device, a GPS system, a digital camera, a wearable device as a smart watch, a PCMCIA, Cardbus 32 card, a sensor, or generally a multifunction wireless device which combines the functionality of multiple devices) containing a slim radiating system that covers a wide range of radio-frequencies and handles multiple communication bands while exhibiting a suitable radio-frequency performance.

It is another object of the invention to provide a slim radiating system suitable for being included within electronic devices, and more preferably within slim electronic devices.

It is another object of the invention to provide a standard slim radiating system which only requires minor adjustments to be included within different electronic devices.

Another object of the invention refers to the location (on the device) of radiation boosters and, more particularly, booster bars for obtaining the most favorable frequency bandwidth values.

An electronic device according to the invention may have a candy-bar shape, which means that its configuration is given by a single body. It may also have a two-body configuration such as a clamshell, flip-type, swivel-type or slider structure. In some other cases, the device may have a configuration comprising three or more bodies. It may further or additionally have a twist configuration in which a body portion (e.g. with a screen) can be twisted (i.e., rotated around two or more axes of rotation which are preferably not parallel). The electronic device may comprise a memory module, a processing circuitry module, a user interface module, a battery, and a wireless communication module.

The wireless communication module may include a slim radiating system, a radio-frequency transceiver circuit, a power amplifier circuit and a base-band module. The slim radiating system may be coupled to the power amplifier via a conductive path and to the radio transceiver circuit via a conductive path. The wireless communication module may include a multiplexing stage coupled to the slim radiating system via a conductive path.

A slim radiating system in accordance with the invention may include a slim radiating structure, a radio-frequency system, at least one internal conductive path and at least one external conductive path. The slim radiating structure may include a ground element and at least one radiation booster, which in some embodiments may be a booster bar, separated from the ground element by a gap.

A slim radiating structure may comprise a ground element and one, two, three, four or even more radiation boosters. In some preferred embodiments, said radiation boosters may be booster bars featuring an elongated shape. In preferred embodiments, each booster bar or radiation booster is separated from the ground element by a gap.

An aspect of the present invention relates to the use of the ground element (or ground plane layer) of the slim radiating system as a main source of radiation.

A radiation booster includes a dielectric material and in some embodiments, a single standard layer of dielectric material spacing two or more conductive elements. A single standard layer of dielectric material refers to dielectric material with a standard thickness, which is available off-the-shelf. For example, 0.025" (0.635 mm), 0.047" (1.2 mm), 0.093" (2.36 mm) or 0.125" (3.175 mm) are common/standard thicknesses for dielectric materials which are available in the market. Examples of dielectric materials may include fiber-glass FR4, Cuclad, Alumina, Kapton, Ceramic and for instance commercial laminates and substrates from Rogers® Corporation (RO3000® and RO4000® laminates, Duroid substrates and alike) or other suitable non-conductive materials.

The radiation booster may be formed by printing or depositing conductive material in a first and a second surface of the dielectric material (e.g. top and bottom) and adding several vias to electrically connect the conductive material in the first surface with the conductive material in the second surface. The conductive material in the first and second surfaces may have a substantially polygonal shape. Some possible polygonal shapes are for instance, but not limited to, squares, rectangles, and trapezoids. When the conductive material in said first and second surfaces has an elongated shape, for instance a rectangular shape, the radiation booster takes the form of a booster bar; a booster bar may also include vias that electrically connect the conductive material in the first surface with the conductive material in the second surface.

The elongated shape of a booster bar is characterized by two slim form factors: a slim width factor and a slim height factor. The slim width factor is a ratio between a length of the booster bar and a width of the booster bar. The slim height factor is a ratio between the length of the booster bar and a height of the booster bar.

The slim width factor characterizes the ratio between the length and the width of the booster bar, whereas the slim height factor characterizes the ratio between the length and the height of the booster bar. In a preferred embodiment, the value for the slim width factor and the slim height factor is greater than 2, for instance in one or more of those embodiments the value for the slim width factor is greater than 3, and preferably larger than 3.5, and the slim height factor is greater than 4. In another preferred embodiment, the value for the slim width factor is greater than 6 and/or the slim height factor is greater than 6. In another preferred embodiment, the value for the slim width factor is greater than 6 and/or the slim height factor is larger than 9. In some less preferred embodiments, the values for both the slim width factor and the slim height factor are between 1 and 2. The slim width factor and the slim height factor of a booster bar may take any of the values listed above yet being smaller than 25, and preferably smaller than 10.

A radiation booster may comprise one, two or more booster bars electrically connected, forming a booster element that fits in an imaginary sphere having a diameter smaller than ⅓ of a radiansphere corresponding to the lowest frequency of operation of the slim radiating system. Such a booster element may also be characterized by a slim width factor, a slim height factor, and a location factor. Any booster element according to the present invention may be limited by a slim width factor and a slim height factor, each of these factors being between 1 and 10, and preferably between 2 and 10.

An advantageous aspect of the invention refers to a booster bar built on a single standard layer of dielectric material that is manufactured at a competitive cost.

Another advantageous aspect of the invention refers to a booster bar having a slim width factor and/or slim height factor that enables the booster bar to occupy only a small portion within the electronic wireless device and making it suitable for its integration within slim electronic devices or flexible electronic devices.

Another advantageous aspect of the present invention refers to the location and slim form factors of a booster bar to guarantee the most advantageous frequency bandwidth for the available space.

A radiation booster, like for instance a booster bar, is separated from the ground plane layer by a gap. In the context of this document, the gap refers to a minimum distance between a point at an edge of the ground plane layer and a point at an edge of the bottom conductive surface of the radiation booster. The location of the radiation booster is characterized by a location factor that is a ratio between the width of the radiation booster and the gap. In a preferred example, the location factor is between 0.5 and 2. In another preferred example, the location factor is between 0.3 and 1.8.

Each radiation booster of the slim radiating system advantageously couples the electromagnetic energy from the radio-frequency system to the ground element in transmission, and from the ground element to the radio-frequency system in reception. The radiation boosters excite a radiation mode in the ground element enabling the radiation from the ground element.

The form factor of the radiation booster, together with its location in relation to the ground element, is configured to achieve a proper excitation of the radiation mode of the ground element. The location factor is selected to achieve the most favorable frequency bandwidth for a radiation booster with a certain form factor, particularly a booster bar.

Apart from the form factor of the radiation booster, the gap is also relevant for properly exciting a radiation mode in the ground plane layer and to achieve the most advantageous frequency bandwidth. The bandwidth of the slim radiating system may be degraded if the location factor is not properly selected.

The location factor and the slim form factors of a booster bar are selected to ensure the most favorable frequency bandwidth while minimizing/reducing the amount of space allocated towards the integration of the booster bar within the electronic device.

The slim radiating structure is mounted within the electronic device and is coupled to the radio-frequency system via a conductive path. The radiation booster is coupled to the ground element via a conductive path and is located at certain distance from the ground element. Said conductive path comprises a conductive element which may be linear or include a surface; the conductive element may comprise, for instance but not limited to, a metallic strip and/or a conductive trace.

In some embodiments, a slim radiating structure comprises one ground element or conductive material acting as a ground plane for the slim radiating structure. In some other embodiments, a slim radiating structure may comprise two, three or more ground elements or conductive materials acting as a ground plane for the radiating structure. In such embodiments, the plurality of ground elements may be electrically interconnected one to each other.

The at least one radiation booster for a slim radiating structure according to the present invention may have a maximum size at least smaller than 1/15 of the free-space wavelength corresponding to the lowest frequency of the first frequency region of operation. In some cases, said maximum size may be also smaller than 1/20, and/or 1/25, and/or 1/30, and/or 1/50, and/or 1/100 of the free-space wavelength corresponding to the lowest frequency of the first frequency region of operation. In some cases, the at least one radiation booster fits in an imaginary sphere having a diameter smaller than 1/3, or preferably smaller than 1/4, or preferably smaller than 1/6, or even more preferably smaller than 1/10 of a radiansphere at said free-space wavelength. The radiansphere is defined as an imaginary sphere having a radius equal to the operating wavelength divided by two times $\pi$ (pi).

Furthermore, in some examples, the at least one radiation booster also has a maximum size smaller than 1/15, and/or 1/20, and/or 1/25, and/or 1/30, and/or 1/50 of the free-space wavelength corresponding to the lowest frequency of the second frequency region of operation. In some cases, the at least one radiation booster fits in an imaginary sphere having a diameter smaller than 1/3, or preferably smaller than 1/4, or preferably smaller than 1/6, or even more preferably smaller than 1/10 of a radiansphere at said free-space wavelength.

Additionally, in some of these examples the at least one radiation booster has a maximum size larger than 1/1400, 1/700, 1/350, 1/250, 1/180, 1/140, or 1/120 times the free-space wavelength corresponding to the lowest frequency of said first frequency region.

The maximum size of a radiation booster is preferably defined by the largest dimension of a booster box that completely encloses said radiation booster, and in which the radiation booster is inscribed. More specifically, a booster box for a radiation booster is defined as being the minimum-sized parallelepiped of square or rectangular faces that completely encloses the radiation booster and wherein each one of the faces of said minimum-sized parallelepiped is tangent to at least a point of said radiation booster. Moreover, each possible pair of faces of said minimum-size parallelepiped sharing an edge forms an inner angle of 90°. In those cases in which the radiating structure comprises more than one radiation booster, a different booster box is defined for each of them.

In some preferred examples, the area defined by the two largest dimensions of a booster box is advantageously small compared to the square of the wavelength corresponding to the lowest frequency of the first frequency region; in particular, a ratio between said area and the square of the wavelength corresponding to the lowest frequency of the first frequency region may be advantageously smaller than at least one of the following percentages: 0.15%, 0.12%, 0.10%, 0.08%, 0.06%, 0.04%, or even 0.02%. In some of these examples, a ratio between the area defined by the two largest dimensions of a booster box and the square of the wavelength corresponding to the lowest frequency of the second frequency region may also be advantageously smaller than at least one of the following percentages: 0.50%, 0.45%, 0.40%, 0.35%, 0.30%, 0.25%, 0.20%, 0.15%, 0.10%, or even 0.05%.

Moreover, in some embodiments according to the present invention, the at least one radiation booster will entirely fit inside a limiting volume equal or smaller than L3/25000, and in some cases equal or smaller than L3/50000, L3/100000, L3/150000, L3/200000, L3/300000, L3/400000, or even smaller than L3/500000, being L the wavelength corresponding to the lowest frequency of the first frequency region of operation.

A slim radiating system according to the invention is configured to handle multiple communication bands, and to provide coverage and an acceptable level of reflection coefficient in a wide range of communication bands in one or more frequency regions of operation exhibiting a suitable radio-frequency performance. The slim radiating system is designed to transmit and receive radio-frequency signals in multiple communication bands of interest, including frequency bands that may be added, for instance, through the deployment of future cellular telephone bands and/or data service bands.

In the context of this document, a frequency band preferably refers to a range of frequencies used by a particular cellular communication standard, a wireless connectivity standard or a broadcast standard, while a frequency region preferably refers to a continuum of frequencies of the electromagnetic spectrum. For example, the GSM 1800 standard is allocated in a frequency band from 1710 MHz to 1880 MHz while the GSM 1900 standard is allocated in a frequency band from 1850 MHz to 1990 MHz. A device operating the GSM 1800 and the GSM1900 standards must have a radiating system capable of operating in a frequency region from 1710 MHz to 1990 MHz. As another example, a wireless device operating the GSM 850 standard (allocated in a frequency band from 824 MHz to 894 MHZ) and the GSM 1800 standard must have a radiating system capable of operating in two separate frequency regions.

Some frequency bands that the slim radiating system may be configured to transmit and receive signals in are, for example, GSM 850 (824-894 MHZ), GSM 900 (880-960 MHz), GSM 1800 (1710-1880 MHZ), GSM 1900 (1850-1990 MHz), WCDMA 2100 (1920-2170 MHZ), CDMA 1700 (1710-2155 MHZ), LTE 700 (698-798 MHZ), LTE 800 (791-862 MHZ), LTE 2600 (2500-2690 MHz), LTE 3500 (3.4-3.6 GHZ), LTE 3700 (3.6-3.8 GHZ), WiFi or WLAN (2.4-2.5 GHz and/or 4.9-5.9 GHZ), etc. A wireless handheld or portable device according to the present invention may operate one, two, three, four or more cellular communication standards, wireless connectivity standards, and/or broadcasts standards, each standard being allocated in one, two or more frequency bands, and said frequency bands being contained within one, two or more frequency regions of the electromagnetic spectrum.

The slim radiating system is designed to provide an acceptable level of reflection coefficient in the frequency regions of operation. A slim radiating system according to the present invention is configured to operate in at least one frequency region. In some embodiments, the slim radiating system is configured to operate in a first frequency region comprising at least a first frequency band, and a second frequency region comprising at least a second frequency band. Such radiating system is configured to satisfy the radio-frequency bandwidths and frequency coverage goals. A slim radiating system according to the present invention may advantageously feature an impedance bandwidth in the first frequency region larger than 5%, 10%, 15%, or even larger than 20%. In addition, such radiating system may also feature an impedance bandwidth in the second frequency region larger than 5%, 10%, 15%, 20%, 25%, 30%, 35%, or even larger than 40%. The impedance bandwidth is defined as the difference between the highest and lowest frequencies of a frequency region, divided by the central frequency of the same frequency region.

Due to the small size of the radiation boosters, the radiation boosters and booster bars may be electrically short at some or all frequencies of operation. A slim radiating structure according to the present invention may feature a first resonant frequency, measured at an internal path, at a frequency higher (i.e. above) than the highest frequency of the first frequency region of operation when said radio-frequency system is disconnected. Moreover, when the radio-frequency system is disconnected, the input impedance of the slim radiating structure measured at the internal path may have an important reactance, in particular a capacitive reactance, within the frequencies of said first frequency region. In this case, a ratio between the first resonant frequency of the slim radiating structure and the highest frequency of the first frequency region is advantageously greater than 1.2. In some cases, said ratio may be even greater than one or more of the following values: 1.5, 1.8, 2.0, 2.2, 2.4, 2.6, 2.8, or 3.0. In some examples, a ratio between said first resonant frequency and the lowest frequency of the first frequency region of operation is advantageously greater than 1.3, or even greater than one or more of the following values: 1.4, 1.5, 1.8, 2.0, 2.2, 2.4, 2.6, 2.8, or 3.0.

In some embodiments, the first resonant frequency of the slim radiating structure, measured at an internal path when the radio-frequency system is disconnected, is above the highest frequency of the second frequency region, wherein a ratio between said first resonant frequency and said highest frequency of the second frequency region may be larger than one or more of the following values: 1.0, 1.1, 1.2, 1.4, 1.6, 1.8, or 2.0. In some other embodiments, said first resonant frequency is within the second frequency region. In some other examples, said first resonant frequency is above the highest frequency of the first frequency region and below the lowest frequency of the second frequency region.

In the context of this document, a resonant frequency associated to a radiation booster of the slim radiating structure preferably refers to a frequency at which the input impedance of the slim radiating structure, the impedance being measured at the internal path coupling the radiation booster to the radio-frequency system when the radio-frequency system is not connected, has an imaginary part equal or substantially equal to zero.

The radio-frequency system may comprise one or more matching circuits that modify the impedance of the slim radiating structure providing impedance matching to the slim radiating system, at an external path, in one or more frequency regions of operation of the slim radiating system.

A radio-frequency system according to the invention may include at least one matching network with a plurality of stages, for instance, two, three, four, five, six or more stages. A stage comprises one or more circuit components (for example but not limited to, inductors, capacitors, resistors, jumpers, short-circuits, delay lines, or other reactive or resistive components). In some cases, a stage has a substantially inductive behavior in the frequency region or regions of operation of the slim radiating system, while another stage has a substantially capacitive behavior in said frequency region/s, and yet a third one may have a substantially resistive behavior in said frequency region/s. In an example, a stage may substantially behave as a resonant circuit (such as, for instance, a parallel LC resonant circuit or a series LC resonant circuit) in at least one frequency region of operation of the slim radiating system. The use of stages having a resonant circuit behavior allows one part of a given matching network be effectively connected to another part of said matching network for a given range of frequencies, or in a given frequency region, and be effectively disabled for another range of frequencies, or in another frequency region.

In some examples, the at least one matching network alternates stages connected in series (i.e. cascaded) with stages connected in parallel (i.e. shunted), forming a ladder structure. In some cases, a matching network comprising two stages forms an L-shaped structure (i.e. series-parallel or parallel-series). In some cases, a matching network comprising three stages forms either a pi-shaped structure (i.e. parallel-series-parallel) or a T-shaped structure (i.e. series-parallel-series).

In some embodiments, a radio-frequency system according to the present invention comprises a matching circuit in a ladder topology. Such matching circuit preferably comprises one reactive component per stage. In some other embodiments, a radio-frequency system according to the present invention comprises a matching circuit at least including a series LC resonant circuit and a parallel LC resonant circuit.

In a preferred embodiment, an electronic device comprises a slim radiating system configured to transmit and receive electromagnetic wave signals in at least one frequency region of the electromagnetic spectrum, and comprising a slim radiating structure, a radio-frequency system, at least one internal conductive path and at least one external conductive path. The slim radiating structure comprises at least one ground element and at least one booster bar. The at least one internal conductive path comprises a conductive element that couples the at least one booster bar to the radio-frequency system. The radio-frequency system comprises at least one matching circuit modifying the impedance of the slim radiating structure providing impedance matching to the slim radiating system in the at least one frequency region at the at least one external conductive path. The at least one booster bar has an elongated shape, and is characterized by a slim width factor greater than 3 and a slim height factor greater than 3, is separated from the at least one ground element by a gap and is characterized by a location factor between 0.5 and 2.

Another preferred embodiment relates to an electronic device including a slim radiating system that comprises a slim radiating structure, a radio-frequency system, an internal conductive path and at least one external conductive path; the slim radiating system is configured to transmit and receive electromagnetic wave signals in a first frequency region and a second frequency region. The slim radiating structure comprises at least one ground element, and one booster bar separated from the ground element by a gap and is characterized by a location factor between 0.3 and 1.8. The internal conductive path comprises a conductive element that couples the booster bar to the radio-frequency system. The radio-frequency system comprises a matching circuit that modifies the impedance of the slim radiating structure providing impedance matching to the slim radiating system in the first and second frequency regions at the at least one external conductive path. The first and second frequency regions are preferably separated so that the lowest frequency of the second frequency region is above the highest frequency of the first frequency region. Some preferred matching circuits for such preferred embodiment are described in FIGS. 15A-15F.

Further, an advantageous aspect of the invention refers to a radio-frequency system comprising a matching circuit that provides impedance matching to the slim radiating system in first and second frequency regions preferably not requiring a filtering circuit or component that separates frequencies of the first frequency region from frequencies of the second frequency region (e.g. a diplexer, a bank of filters, etc.) for providing impedance matching in the first frequency region and second frequency region independently (i.e. in two separate branches or paths). Thus preferred matching circuits may provide impedance matching in said first and second frequency regions with one branch.

According to the present invention, some preferred matching circuits preferably comprise seven or less components, for instance: two, three, four, five, six or seven. Such matching circuits preferably do not comprise active circuits or components.

In some embodiments in which the slim radiating system is configured to transmit and receive signals in a first frequency region and a second frequency region, a ratio between the lowest frequency of the second frequency region and the lowest frequency of the first frequency region may be greater than 1.5. In some of these embodiments, said ratio may be also greater than 1.8, 2.0, 2.2, or 2.4. In addition, in some embodiments in which the slim radiating system is configured to operate signals from first and second frequency regions, a ratio between the lowest frequency of the second frequency and the highest frequency of the first frequency region may be greater than 1.2, 1.5, 1.8, 2.0, 2.2, or 2.4.

Accordingly, an advantageous aspect of such radio-frequency system is its efficiency in that impedance matching in the first and second frequency regions may be provided with one matching circuit using a reduced number of components, which consequently introduces lower losses in the radio-frequency system and makes it more robust against the tolerances of the components. Moreover, by not including filtering circuits such as diplexers, the radio-frequency system avoids the insertion losses characterizing such type of circuits and the necessity of having two separate matching circuits, which consequently makes the radio-frequency system have less components and the slim radiating system smaller in terms of area occupied in the device.

In a third preferred embodiment, an electronic device includes a slim radiating system comprising a slim radiating structure, a radio-frequency system, first and second internal conductive paths and at least one external conductive path; the slim radiating system is configured to transmit and receive electromagnetic wave signals in a first frequency region and a second frequency region. The slim radiating structure comprises at least one ground plane layer, first and second radiation boosters, each of the first and second radiation boosters being separated from the ground plane layer by a gap. The first internal conductive path comprises a conductive element that couples the first radiation booster to the radio-frequency system, and the second internal conductive path comprises a conductive element that couples the second radiation booster to the radio-frequency system. The radio-frequency system comprises a matching circuit coupled to the first and second internal conductive paths and to the external conductive path, the matching circuit modifies the impedance of the slim radiating structure providing impedance matching to the slim radiating system in the first and second frequency regions.

In some cases, the slim radiating system may comprise a first external conductive path and a second external conductive path, and the radio-frequency system may include a diplexer circuitry that advantageously filters signals from first and second frequency regions, said signals being matched in impedance in the first and second frequency regions by the matching circuit within the radio-frequency system. A first port of the diplexer is connected to the matching circuit, and the two remaining ports of the diplexer are connected to the first and second external conductive paths. The first and second external paths comprise, respectively, signals for frequencies from the first frequency region, and signals for frequencies from the second frequency region.

A further aspect of the present invention relates to a test platform for electromagnetically characterizing radiation boosters. Said platform comprises a substantially square conductive surface on top of which, and substantially close to the central point, the element to be characterized is mounted perpendicular to said surface in a monopole configuration, said conductive surface acting as the ground plane.

The substantially square conductive surface comprises sides with a dimension larger than a reference operating wavelength. In the context of the present invention, said reference operating wavelength is the free-space wavelength equivalent to a frequency of 900 MHz. A substantially square conductive surface according to the present invention is made of copper with sides measuring 60 centimeters, and a thickness of 0.5 millimeters.

In the test configuration as set forth above, a booster bar according to the present invention may be characterized by a ratio between the first resonance frequency and the reference frequency (900 MHz) being larger than a minimum ratio of 3.0. In some cases, said ratio may be even larger than a minimum ratio such as: 3.4, 3.8, 4.0, 4.2, 4.4, 4.6, 4.8, 5.0, 5.2, 5.4, 5.6, 5.8, 6.0, 6.2, 6.6 or 7.0.

A booster bar according to the present invention may also be characterized by a radiation efficiency measured in said platform, at a frequency equal to 900 MHz, being less than 50%, preferably being less than 40%, 30%, 20%, or 10%, and in some cases being less than 7.5%, 5%, or 2.5%. All those are quite remarkably low efficiency values considering the additional 1:3 frequency mismatch and beyond obtained in some of the embodiments as described above. Such a frequency shift would introduce further mismatch losses that would result in an overall antenna efficiency below 5%, and quite typically below 2%, which would be ordinarily considered unacceptable for a mobile phone or wireless application. Still, quite surprisingly, when combining at least one booster bar with the radio-frequency system of a slim radiating system according to the present invention, said slim radiating system recovers the efficiency required for the performance of a typical wireless device.

BRIEF DESCRIPTION OF THE DRAWINGS

Embodiments of the invention are shown in the enclosed figures.

DETAILED DESCRIPTION

Further characteristics and advantages of the invention will become apparent in view of the detailed description of some preferred embodiments which follows. Said detailed description of some preferred embodiments of the invention is given for purposes of illustration only and in no way is meant as a definition of the limits of the invention, made with reference to the accompanying figures.

Figure 1A:
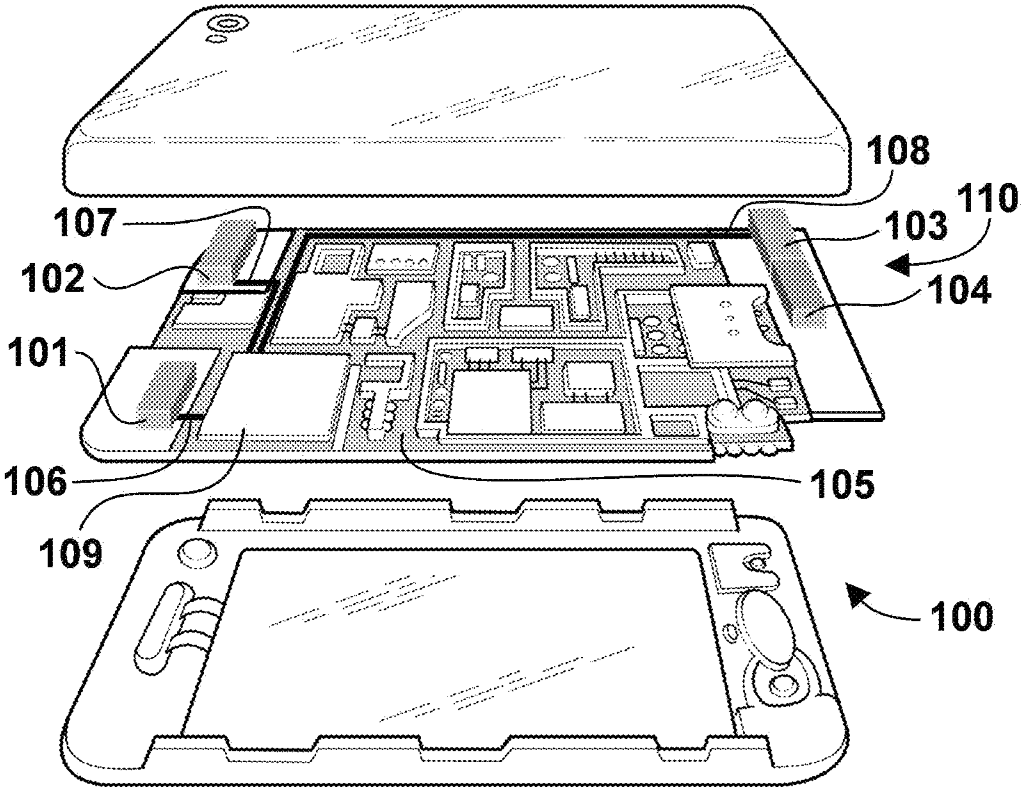
FIGS. 1A-1B—Show examples of wireless handheld devices including slim radiating systems according to preferred embodiments of the invention.
Figure 1B:
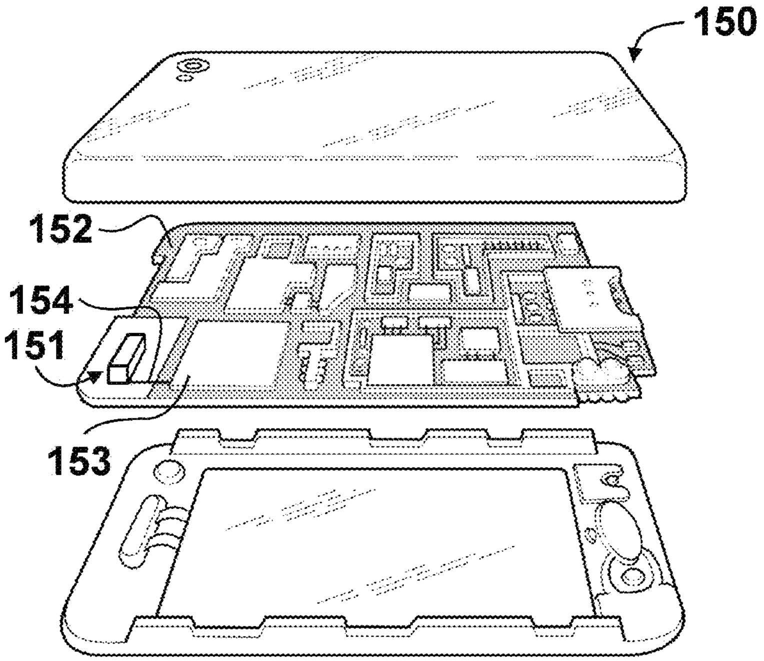

Illustrative wireless electronic devices including a slim radiating system in accordance with the present invention are shown in FIGS. 1A and 1B. In the particular arrangement of FIG. 1A, the wireless electronic device 100 is a smartphone although it might represent other wireless electronic devices such as for instance a phablet or a tablet. The slim radiating system includes a first booster bar 101, a second booster bar 102, a booster element 110, and a ground element 105 (which may be included in a layer of a multilayer printed circuit board). The booster element 110 comprises two contiguous booster bars: the third booster bar 103 and the fourth booster bar 104. The first booster bar 101 is coupled to a radio-frequency system 109 via a conductive path 106, the second booster bar 102 is coupled to the radio-frequency system 109 via a conductive path 107, and the booster element 110 is coupled to the radio-frequency system 109 via a conductive path 108.

In FIG. 1B there is shown a wireless handheld device 150 in an exploded perspective view, the device comprises a slim radiating structure and a radio-frequency system 153. The slim radiating structure comprises a radiation booster 151 taking the form of a booster bar with an elongated shape, and a ground plane layer 152. The booster bar 151 is coupled to the radio-frequency system via the internal conductive path 154 which, in this particular example, may be a conductive trace.

In the examples of FIGS. 1A and 1B, the booster bars are arranged on a part of the device free of ground plane, so there is no ground plane in the orthogonal projection of the booster bars onto the plane comprising the ground plane layers 105 and 152, respectively. In other embodiments, the orthogonal projection of a booster bar or other radiation booster onto the plane comprising the ground plane layer may be overlapped partially or completely by the ground plane layer.

Figure 2A:
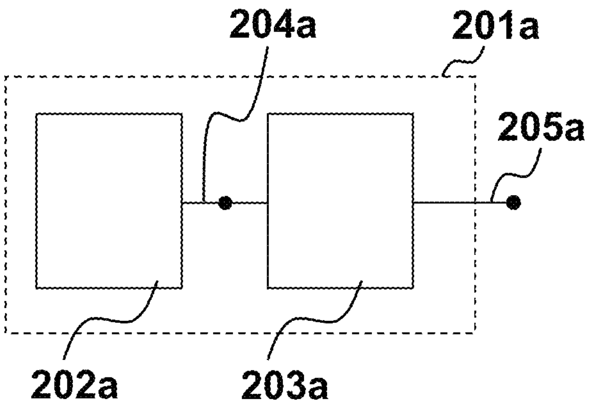
FIGS. 2A-2D—Block diagram representations of five examples of slim radiating systems in according with some preferred embodiments of the present invention.

FIG. 2A shows a block diagram representation of a slim radiating system for an electronic device. The slim radiating system 201*a* comprises slim radiating structure 202*a*, radio-frequency system 203*a*, internal conductive path 204*a*, and external conductive path 205*a*. The slim radiating structure is coupled to the radio-frequency system via the internal path 204*a*, and to other RF circuitry for handling RF wave signals via the external path 205*a*. A slim radiating system in accordance with this block diagram is configured to operate in at least one frequency region, or in at least two frequency regions, or in at least three frequency regions.

Figure 2B:
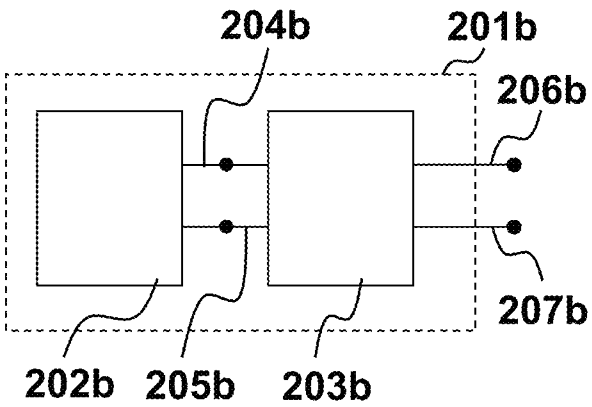

FIG. 2B shows another block diagram of a slim radiating system for an electronic device according to the present invention. The slim radiating system 201*b* comprises slim radiating structure 202*b*, radio-frequency system 203*b*, two internal conductive paths 204*b* and 205*b*, and two external conductive paths 206*b* and 207*b*. The slim radiating structure is coupled to the radio-frequency system via the internal paths 204*b* and 205*b*, and to other RF circuitry for handling RF wave signals via the external paths 206*b* and 207*b*. A slim radiating system in accordance with this block diagram is configured to operate in at least two frequency regions, or in at least three frequency regions.

Figure 2C:
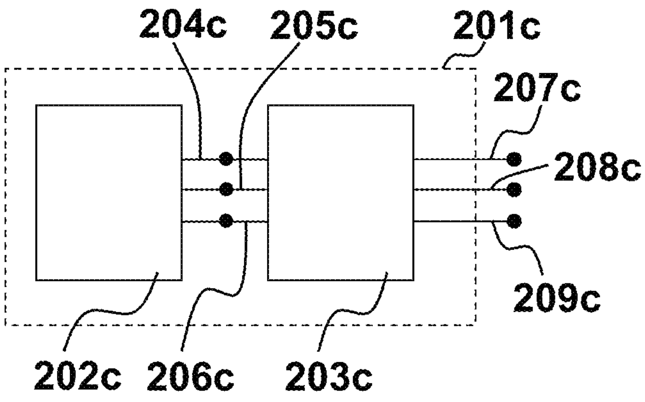

FIG. 2C shows another block diagram of a slim radiating system for an electronic device according to the present invention. The slim radiating system 201*c* comprises slim radiating structure 202*c*, radio-frequency system 203*c*, three internal conductive paths 204*c*, 205*c* and 206*c*, and three external conductive paths 207*c*, 208*c*, and 209*c*. The slim radiating structure is coupled to the radio-frequency system via the internal conductive paths 204*c*, 205*c* and 206*c*, and to other RF circuitry for handling RF wave signals via the external conductive paths 207*c*, 208*c* and 209*c*. A slim radiating system in accordance with this block diagram is configured to operate in at least three frequency regions.

Figure 2D:
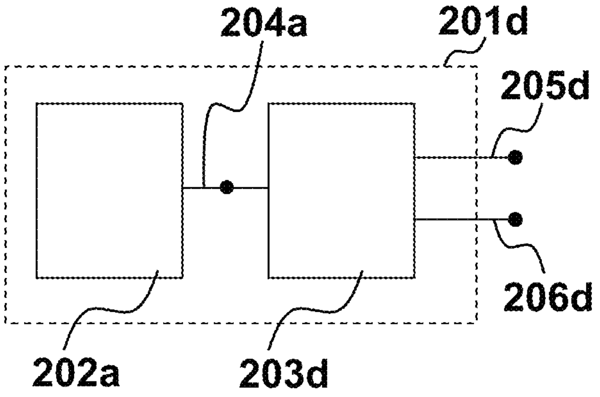

FIG. 2D shows another block diagram of a slim radiating system for an electronic device according to the present invention. The slim radiating system 201*d* is similar to 201*a* from FIG. 2A. It comprises slim radiating structure 202*a*, radio-frequency system 203*d*, internal conductive path 204*a*, and two external conductive paths 205*d* and 206*d*. The slim radiating structure is coupled to the radio-frequency system via the internal paths 204*a*, and to other RF circuitry for handling RF wave signals via the external paths 205*d* and 206*d*. The radio-frequency system 203*d* may comprise a matching circuit configured to provide impedance matching in at least two frequency regions, and a diplexer may be connected to said matching circuit and coupled to the external paths. A slim radiating system in accordance with this block diagram is configured to operate in at least two frequency regions. The radio-frequency system 203*d* is convenient for the interconnection with an RF (radio-frequency) front-end module or RF circuitry that includes separate inputs for signals from the first frequency region and the second frequency region. If such RF front-end module (not illustrated) had one input/output for all the signals, the radio-frequency system 203*a* from FIG. 2A would be more suitable.

Figure 3:
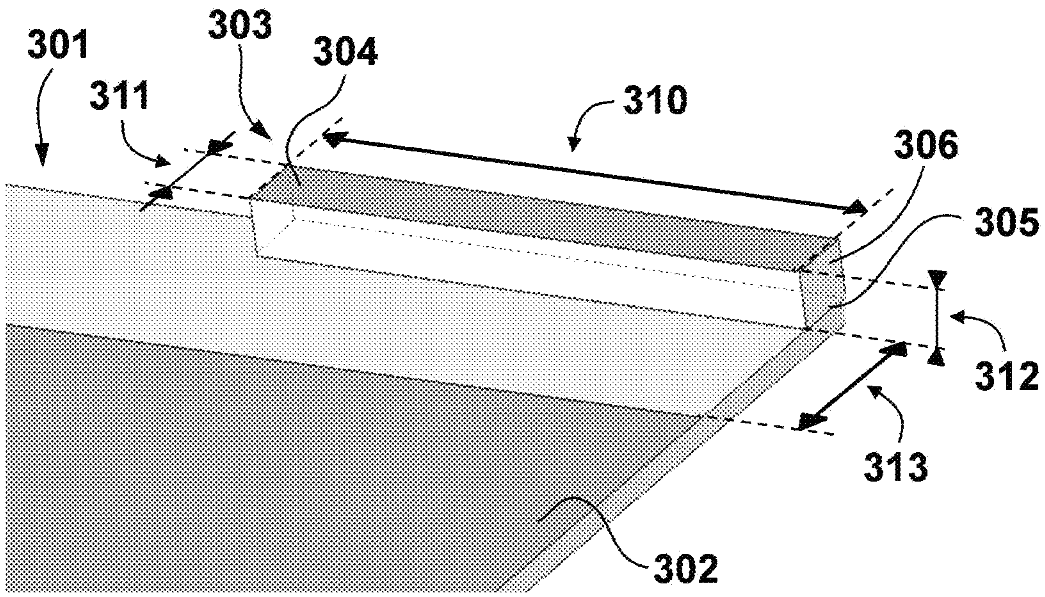
FIG. 3—Shows a perspective view of an example of a slim radiating structure including a booster bar in accordance with the present invention.

FIG. 3 illustrates a preferred example of a slim radiating structure 301 according to the present invention. The slim radiating structure comprises a booster bar 303 and a ground plane layer 302, the booster bar comprises a single standard layer of dielectric material 306 with a top 304 and a bottom 305 conductive surfaces. The booster bar has a length 310, a width 311 and a height 312. The length of the booster bar is taken along the dimension that is substantially parallel to the ground plane layer in the top or bottom conductive surface, the width is taken along the dimension that is substantially perpendicular to the ground plane layer in the top or bottom conductive surface, and the height is taken as the minimum distance between the top conductive surface and the bottom conductive surface. In some embodiments the booster bar comprises pads on a first and a second surface so that the mounting of the booster can be reversed and top and bottom sides can be interchanged.

The size and shape of the booster bar is characterized by a slim width factor and a slim height form factor. The slim width factor is a ratio between the length and the width of the booster bar, and the slim height factor is a ratio between the length and height of the booster bar, being the slim width factor and the slim height factor preferably larger than 3. In this example, where the booster is configured to operate in one or more frequency bands within the 600 MHZ-6 GHz range (e.g. GSM 850 (824-894 MHz), GSM 900 (880-960 MHz), GSM 1800 (1710-1880 MHz), GSM 1900 (1850-1990 MHz), WCDMA 2100 (1920-2170 MHz), CDMA 1700 (1710-2155 MHZ), LTE 700 (698-798 MHZ), LTE 800 (791-862 MHZ), LTE 2600 (2500-2690 MHz), LTE 3500 (3.4-3.6 GHz), LTE 3700 (3.6-3.8 GHz), WiFi (2.4-2.5 GHz and/or 4.9-5.9 GHZ)), the length is 10 millimeters, the width is 3.2 millimeters and the height is 3.2 millimeters, being the slim width factor 3.125 and the slim height factor 3.125, all those dimensions in these and other embodiments, within a typical tolerance of, for instance+/−1%-3% and in some occasions up to a 10% variation. The booster bar is separated from the ground plane by a gap 313; the gap is taken as the minimum distance between the bottom conductive layer and the ground plane layer. The gap distance plus the booster bar's width 311 is characterized as the depth of the radiation booster. The location of the booster bar in relation to the ground plane layer is characterized by a location factor. The location factor is a ratio between the width of the booster bar and the gap, being the location factor preferably in the range of between 0.5 and 2. In this example, the width is 3.2 mm and the gap is 3.3 mm, being the location factor 0.96 and the depth 6.5 mm, all those dimensions within a typical tolerance of, for instance +/−10% variation.

Figure 4A:
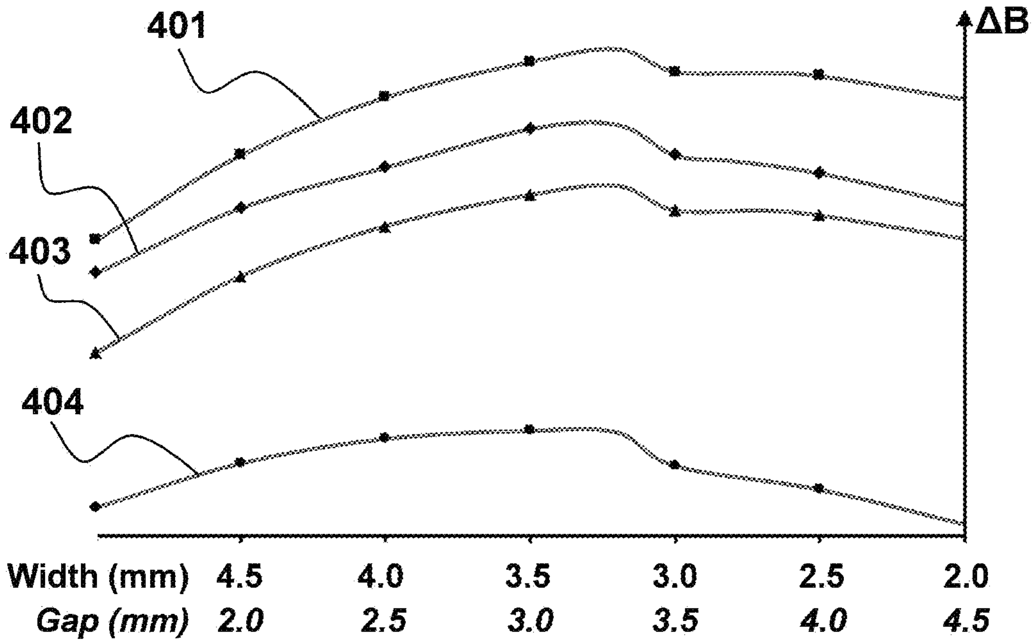
FIGS. 4A-4B—Graphs showing bandwidth performances of several slim radiating systems as a function of the booster bar's width and gap dimensions.
Figure 4B:
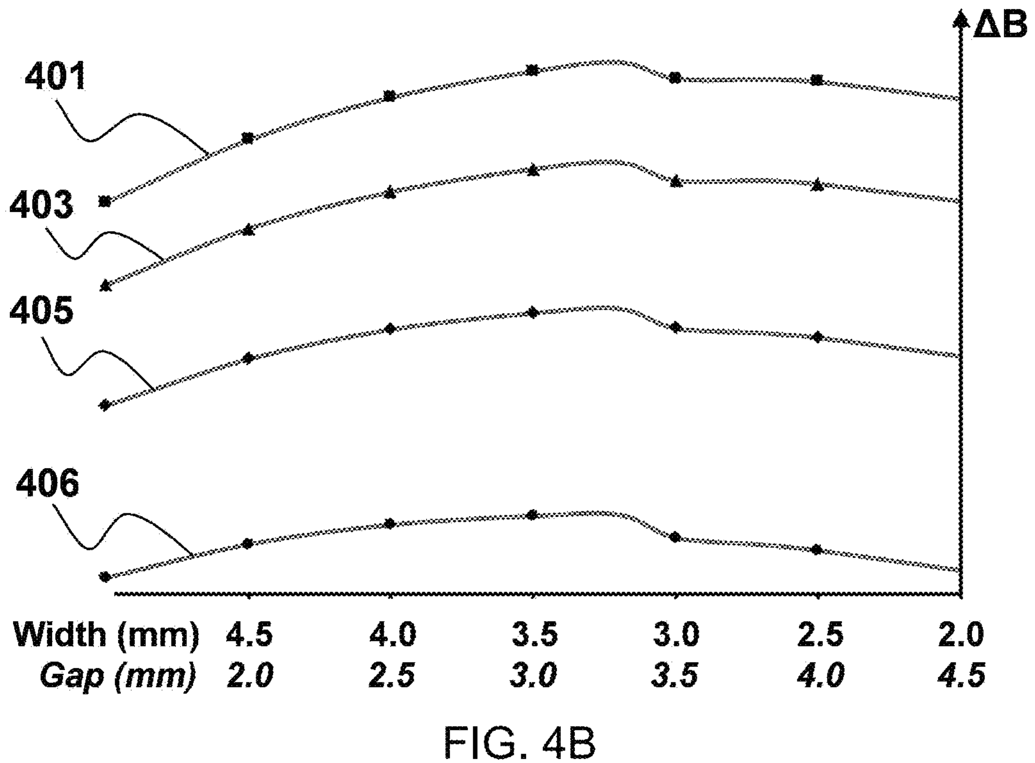

FIG. 4A and FIG. 4B illustrate two examples of the relevance of the location and width of the booster bar in the radio-frequency performance of the slim radiating system; the radio-frequency performance of the slim radiating system is affected by the location of the booster bar with respect to the ground plane layer and the width of the booster bar. FIG. 4A and FIG. 4B plot the potential bandwidths achieved by six slim radiating systems as a function of the booster bar's width and gap dimensions. Curve 401 represents the potential bandwidth of a slim radiating system comprising a booster bar characterized by a height of 2.4 mm and a length of 11.5 mm. Curve 402 represents the potential bandwidth of a slim radiating system that includes a booster bar having a height of 3.2 mm and a length of 9 mm. Curve 403 represents the potential bandwidth of a slim radiating system comprising a booster bar characterized by a height of 2.4 mm and a length of 10.5 mm. Curve 404 represents the potential bandwidth of a slim radiating system comprising a booster bar characterized by a height of 3.2 mm and a length of 7 mm. Curve 405 represents the potential bandwidth of a slim radiating system comprising a booster bar characterized by a height of 2.4 mm and a length of 9 mm. Curve 406 represents the potential bandwidth of a slim radiating system comprising a booster bar characterized by a height of 2.4 mm and a length of 7 mm. As shown in FIG. 4A and FIG. 4B, the potential bandwidth of the slim radiating system depends on the width dimension of the booster bar and the location of the booster bar in relation to the ground plane layer; for each of the curves, there is a region where the most favorable bandwidth values are achieved. In this invention, such region is referred as the effective bandwidth region which corresponds to a range of location factor values that provide the region of most advantageous bandwidth values for the slim radiating system. The preferred values for the location factor are in the range of between 0.5 and 2. Such result is against conventional wisdom as the wider the width of the antenna element, the greater the bandwidth as, for example, in a monopole antenna.

Figure 5:
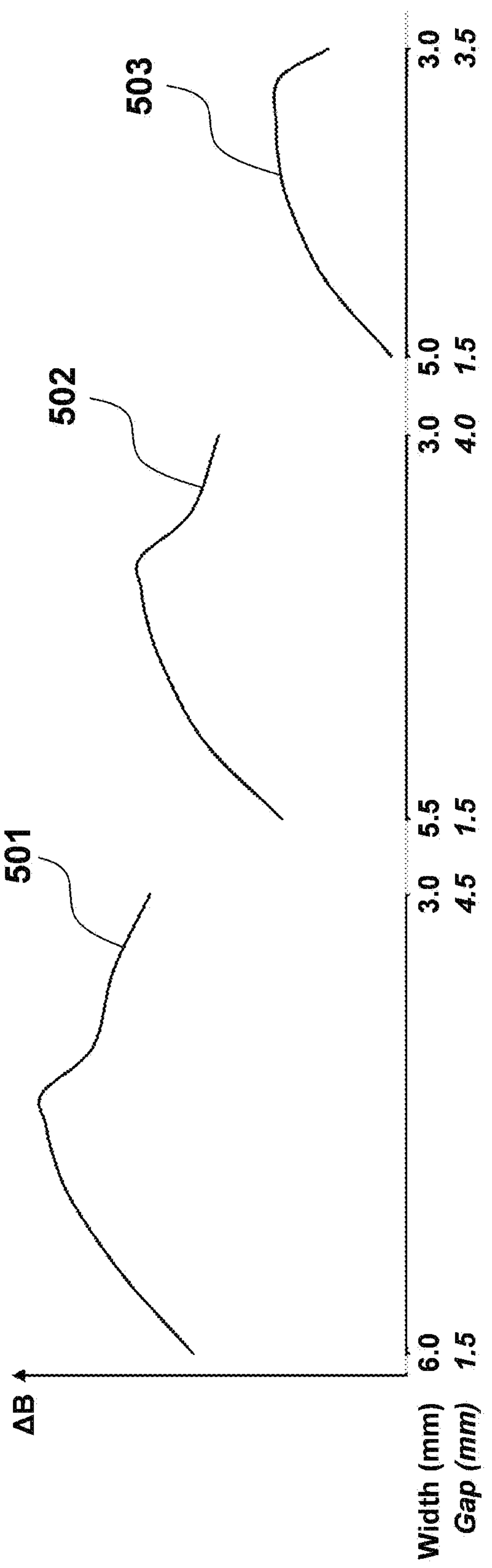
FIG. 5—Graph showing bandwidth performances of a slim radiating system as a function of the booster bar's width and gap dimensions for three different depth values.

FIG. 5 illustrates another example of the effect of the booster bar's location and width on the radio-frequency performance of a slim radiating system; the radio-frequency performance of the slim radiating system is affected by the location of the booster bar with respect to the ground plane layer and the width of the booster bar. FIG. 5 plots the potential bandwidth achieved by the slim radiating system as a function of the booster bar's width and gap dimensions; the three curves 501, 502 and 503 represent the potential bandwidth of a slim radiating system comprising a booster bar having a height of 3.2 mm and a length of 7 mm. Curve 501 refers to the booster bar having a depth of 7.5 mm, curve 502 corresponds to a depth of 7 mm and curve 503 is for a depth of 6.5 mm. As previously shown in FIGS. 4A and 4B, the potential bandwidth of the slim radiating system depends on the gap that separates the booster bar from the ground plane layer and the width of the booster bar; for each of the curves, there is an effective bandwidth region where the most advantageous bandwidth values are achieved.

Figure 6:
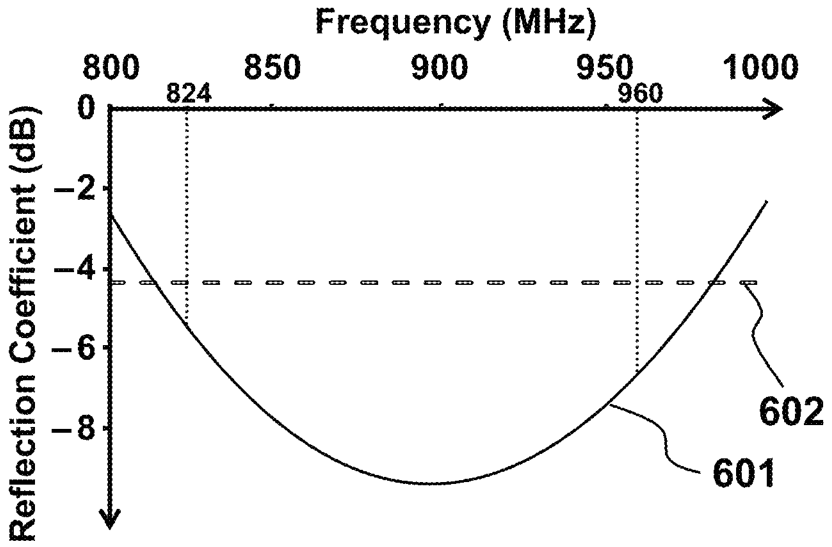
FIG. 6—Graph showing an example of an acceptable radio-electric frequency behavior for a slim radiating system in accordance with the present invention.

One way to characterize the radio-frequency performance of the slim radiating system entails the use of a reflection coefficient plot; a reflection coefficient of less than-4.4 dB is generally acceptable. FIG. 6 illustrates an example of an acceptable radio-frequency performance for a slim radiating system according to the present invention. The slim radiating system comprises a booster bar which is characterized by a width form factor of 3.125, a height form factor of 3.125 and a location factor of 0.96. Curve 601 shows the reflection coefficient of the slim radiating system versus frequency, and line 602 shows an acceptable reference level for the reflection coefficient. In this example, the reflection coefficient is less than-4.4 dB for all the frequencies of the operating frequency region which covers a frequency range of about 824 MHZ to about 960 MHz. Such frequency range enables the slim radiating system to be used to cover at least two communication frequency bands such as a band from 824 MHz to 894 MHz and a band from 880 MHz to 960 MHz. These two bands are examples of bands that can be covered by a slim radiating system; other bands may also be handled by the slim radiating system. In another embodiment, a suitable radio-frequency performance for the slim radiating system corresponds to a reflection coefficient of −6 dB or less for all the frequencies of the operating frequency range.

Figure 7:
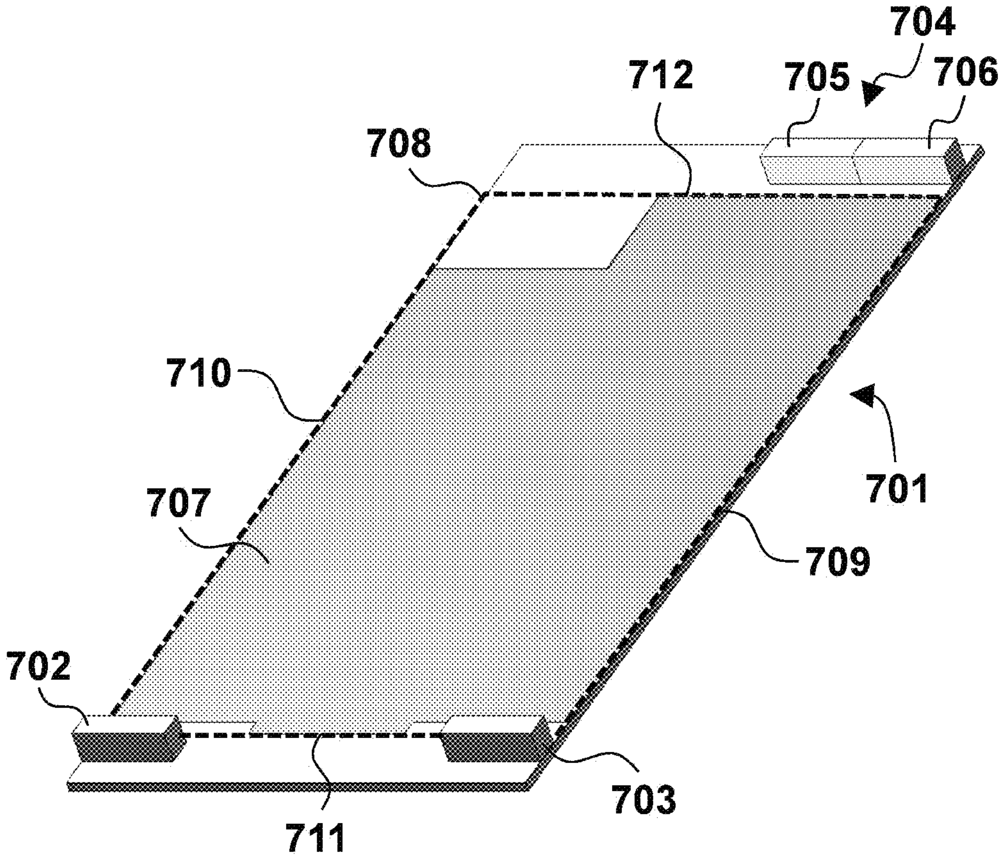
FIG. 7—Shows a perspective view of an example of slim radiating structure including four booster bars in accordance with a preferred embodiment.

FIG. 7 illustrates a preferred example of a slim radiating structure according to the present invention suitable for a slim radiating system configured to operate in three frequency regions. The slim radiating structure 701 comprises a first booster bar 702, a second booster bar 703, a booster element 704 comprising two adjacent booster bars 705 and 706, and a ground plane layer 707. As shown in FIG. 3, each booster bar comprises a single standard layer of dielectric material with top and bottom conductive surfaces; in this example the dielectric material has a height of 3.2 mm. In this example, the first and second booster bars 702, 703 have a slim width factor of 3.125, a slim height factor of 3.125, and a location factor of 0.96; the booster element 704 has a slim width factor of 6.25, a slim height factor of 6.25 and a location factor of 0.96. In general, any suitable shape may be used for the ground plane layer. FIG. 7 illustrates an example of a slim radiating structure according to the present invention suitable for a slim radiating system configured to operate in three frequency regions. The ground plane layer 707 includes clearance regions that may be used to mount other components of the electronic wireless device, or to adjust the ground plane layer to the shape of the electronic wireless device housing or for SAR purposes. The ground plane rectangle 708 (represented with dashed lines for illustrative purposes only) is characterized as the minimum sized rectangle that encompasses the ground plane layer 707. That is, the ground plane rectangle is a rectangle whose sides are tangent to at least one point the ground plane layer. In accordance with the present invention, a first long side of the ground plane layer refers to a long side of the ground plane rectangle 709 or 710; a second long side of the ground plane layer refers to a second long side of the ground plane rectangle 710 or 709; a first short side of the ground plane layer refers to a first short side of the ground plane rectangle 711 or 712; and a second short side of the ground plane layer relates to a second short side of the ground plane rectangle 712 or 711.

Figure 8:
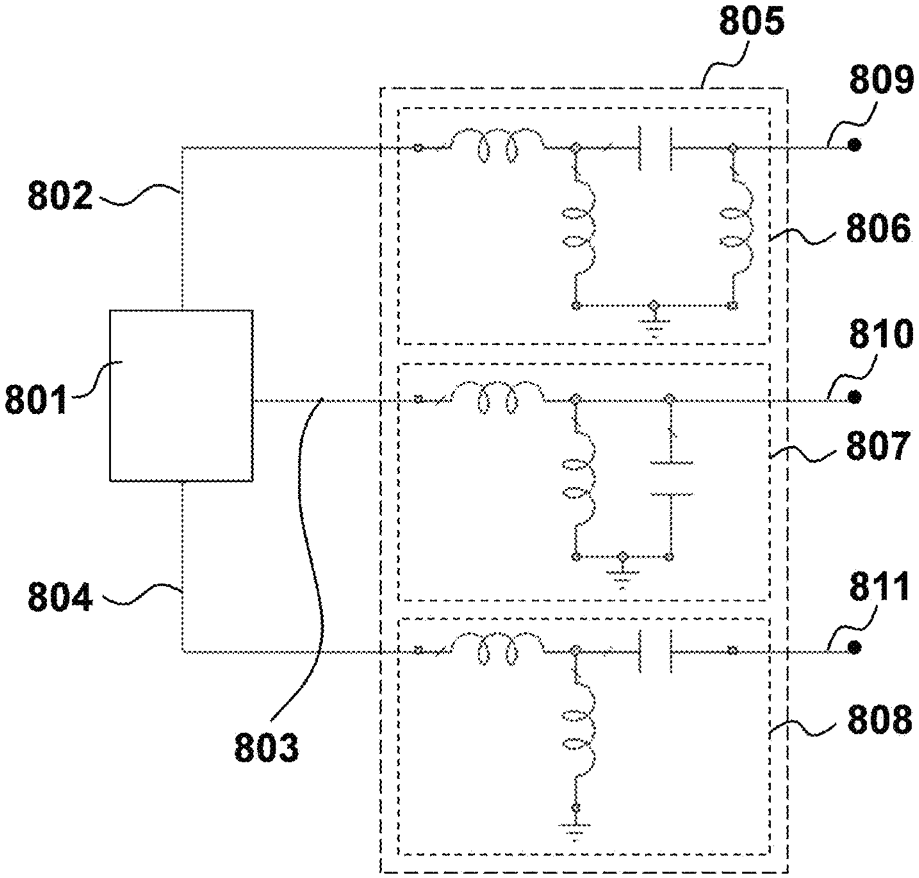
FIG. 8—Plan view of an exemplary radio-frequency system coupled to a slim radiating structure in accordance with the present invention.

FIG. 8 shows an example of a radio-frequency system 805 coupled to a slim radiating structure 801 via internal conductive paths 802, 803 and 804. An example of a suitable slim radiating structure 801 to be coupled to the radio-frequency system 805 is the slim radiating structure shown in FIG. 7. The radio-frequency system 805 comprises a first matching circuit 806, a second matching circuit 807, and a third matching circuit 808. The first matching circuit 806 is configured to ensure that the slim radiating system is impedance-matched at a first frequency region to other circuitry coupled via external conductive path 809. The second matching circuit 807 is configured to provide impedance matching at a second frequency region for other circuitry coupled to external conductive path 810. The third matching circuit 808 is configured to guarantee that the slim radiating system is matched in impedance at a third frequency region at the external conductive path 811. The first, second and third matching networks are therefore configured to ensure an acceptable reference level for the reflection coefficient over an entirety of the first, second and third operating frequency ranges. Each of the first, second and third matching circuits comprises a network of passive components such as inductors and capacitors, which are arranged with a suitable architecture like, for instance, an inductor plus an LC network. Other suitable matching circuits may be used to ensure that the slim radiating system is matched in impedance at the operating frequency ranges; other suitable matching circuits may comprise a network of passive and/or active components, which may be arranged with other suitable architectures.

Figure 9:
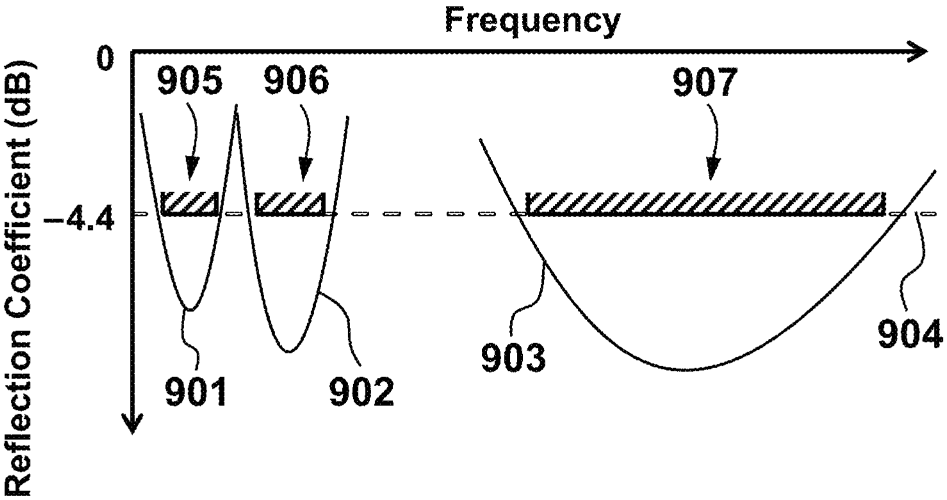
FIG. 9—Graph showing the radio-electric frequency behavior of a slim radiating system including the slim radiating structure of FIG. 7 and the radio-frequency system of FIG. 8.

FIG. 9 illustrates the radio-frequency performance of the slim radiating system resulting from the interconnection of the slim radiating structure 701 to the radio-frequency system 805. Curve 901 shows the reflection coefficient of the slim radiating system versus frequency at a terminal in the external path 809, curve 902 shows the reflection coefficient of the slim radiating system versus frequency at a terminal in the external path 810, curve 903 shows the reflection coefficient of the slim radiating system versus frequency at a terminal in the external path 811, and line 904 shows an acceptable reference level for the reflection coefficient. In this example, the reflection coefficient 901 is less than −4.4 dB for all the frequencies of a first operating frequency region 905, the reflection coefficient 902 is less than −4.4 dB for all the frequencies of a second operating frequency region 906, and the reflection coefficient 903 is less than −4.4 dB for all the frequencies of a third operating frequency region 907. The first operating frequency region 905 of the slim radiating system covers a first frequency range of about 698 MHz to about 798 MHz, the second operating frequency region 906 of the slim radiating system covers a frequency range of about 824 MHz to about 960 MHz, and the third operating frequency region 907 of the slim radiating system covers a third frequency range of about 1710 MHz to about 2690 MHz. The first frequency range enables the slim radiating system to be used to cover at least three communication bands such as a band from 699 MHz to 746 MHz, a band from 746 MHz to 787 MHz, and a band from 758 MHz to 798 MHz. The second frequency range enables the slim radiating system to cover at least two communication frequency bands such as a band from 824 MHz to 894 MHz and a band from 880 MHz to 960 MHz. The third frequency range enables the slim radiating system to cover at least five communication frequency bands such as a band from 1710 MHz to 1880 MHz, a band from 1850 MHZ to 1990 MHz, a band from 1920 MHz to 2170 MHz, a band from 2300 MHz to 2400 MHz, and a band from 2496 MHz to 2690 MHz. Other desirable communication frequency bands may also be handled by the slim radiating system.

Figure 10:
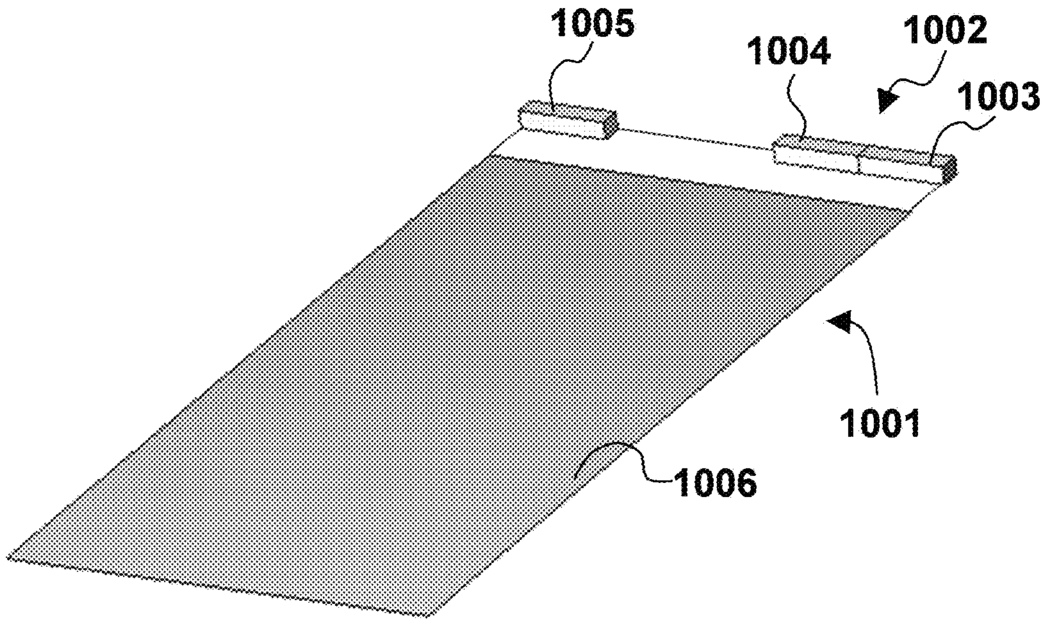
FIG. 10—Perspective view of an exemplary slim radiating structure including three booster bars in accordance with a preferred embodiment.

FIG. 10 illustrates another example of a slim radiating structure in accordance to the present invention; the slim radiating structure is suitable for a slim radiating system that is configured to operate in at least two frequency regions. The slim radiating structure 1001 comprises a first booster element 1002 including a first booster bar 1003 and a second booster bar 1004 adjacent to the first booster bar; the slim radiating structure 1001 further comprises a third booster bar 1005, and a ground plane layer 1006. As shown in FIG. 3, each booster bar may be formed by a single standard layer of dielectric material with top and bottom conductive surfaces. In this example, the dielectric material has a height of 2.4 mm; the first booster element 1002 has a slim width factor of 8, a slim height factor of 10, and a location factor of 0.375; the third booster bar 1005 has a slim width factor of 4, a slim height factor of 5 and a location factor of 0.375.

Figure 11:
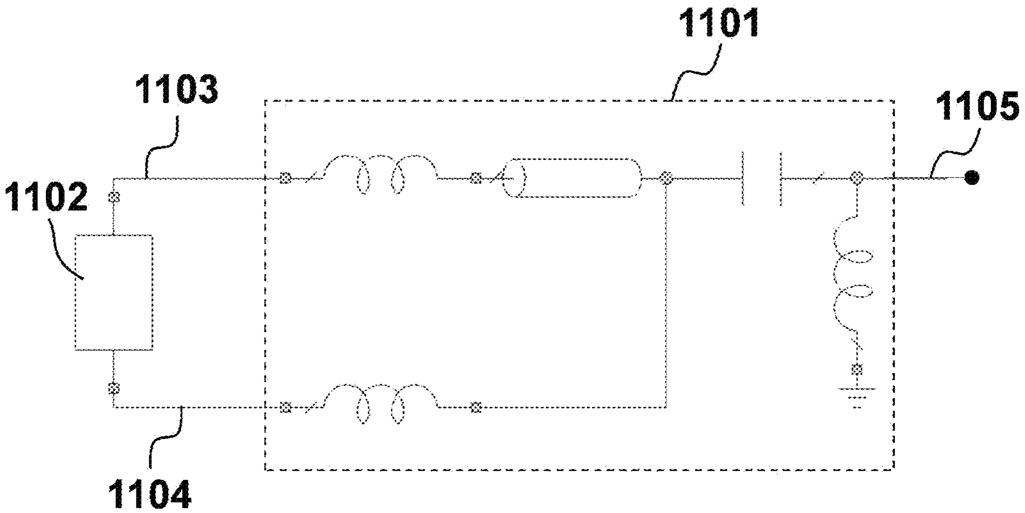
FIG. 11—Plan view of an example of a radio-frequency system coupled to a slim radiating structure in accordance with the present invention.

FIG. 11 shows an example of a radio-frequency system 1101 coupled to a slim radiating structure 1102 via internal conductive paths 1103 and 1104. An example of a suitable slim radiating structure 1102 to be coupled to the radio-frequency system 1101 is illustrated in FIG. 10. The radio-frequency system 1101 comprises a matching circuit being configured to ensure that the slim radiating system is impedance-matched to other circuitry coupled via external conductive path 1105 at a first frequency region and a second frequency region. The matching network is therefore configured to ensure an acceptable reference level for the reflection coefficient over an entirety of the first and second operating frequency ranges. The matching circuit comprises a network of passive components such as inductors, capacitors and transmission lines, which are arranged with a suitable architecture as shown in FIG. 11. Other suitable matching circuits may be used to ensure that the slim radiating system is impedance matched at the operating frequency ranges; other suitable matching circuits may comprise a network of passive and/or active components, which may be arranged with other suitable architectures.

Figure 12:
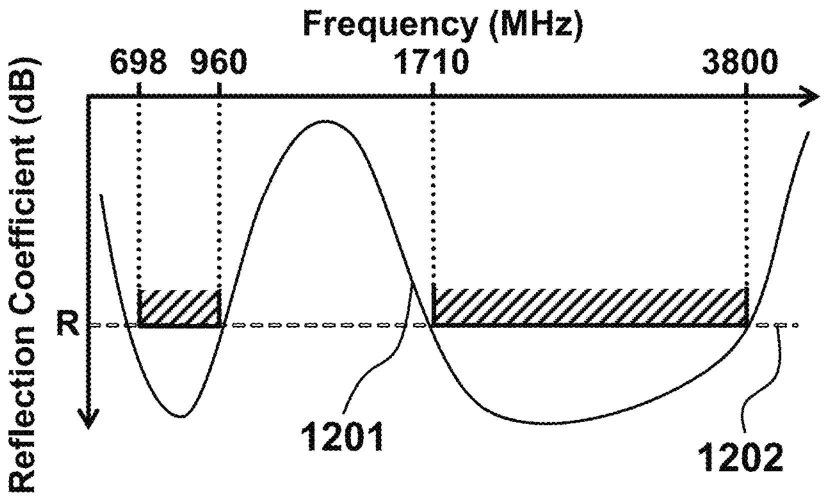
FIG. 12—Graph showing the radio-electric frequency behavior of a slim radiating system including the slim radiating structure of FIG. 10 and the radio-frequency system of FIG. 11.

FIG. 12 illustrates the radio-frequency performance of the slim radiating system resulting from the interconnection of the slim radiating structure 1001 to the radio-frequency system 1101. Curve 1201 shows the reflection coefficient of the slim radiating system versus frequency at a terminal in the external path 1105, and line 1202 shows an acceptable reference level for the reflection coefficient. In this example, the reflection coefficient 1201 is less than-4.4 dB for all the frequencies of the first and second frequency regions. The first operating frequency region of the slim radiating system covers a first frequency range of about 698 MHz to about 960 MHz, and the second operating frequency region of the slim radiating system coves a frequency range of about 1710 MHz to about 3800 MHZ. The first frequency range enables the slim radiating system to be used for covering at least five communication bands such as a band from 699 MHz to 746 MHz, a band from 746 MHz to 787 MHz, a band from 758 MHz to 798 MHZ, a band from 824 MHz to 894 MHz, and a band from 880 MHz to 960 MHz. The second frequency range enables the slim radiating system to cover at least seven communication frequency bands such as a band from 1710 MHz to 1880 MHz, a band from 1850 MHz to 1990 MHz, a band from 1920 MHz to 2170 MHz, a band from 2300 MHz to 2400 MHz, a band from 2496 MHz to 2690 MHz, a band from 3400 MHz to 3600 MHz, and a band from 3600 MHz to 3800 MHZ. Other desirable communication frequency bands may also be handled by the slim radiating system.

Figure 13:
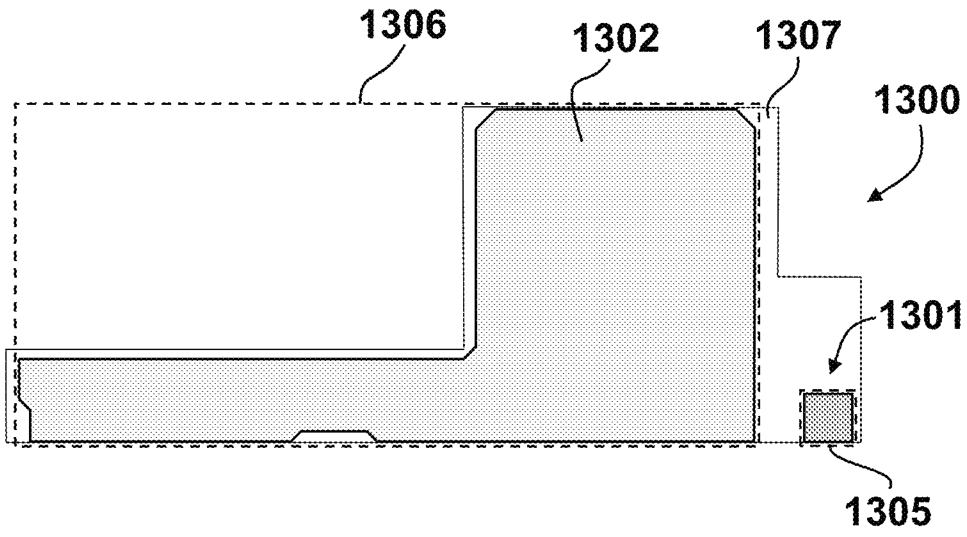
FIG. 13—Shows another exemplary slim radiating structure according to the invention.

Another example of a slim radiating structure is shown in FIG. 13. The slim radiating structure 1300 comprises ground plane layer 1302 on a printed circuit board 1307, and radiation booster 1301 characterized by a slim width factor between 1 and 2, and a slim height factor between 1 and 2. The radiation booster 1301 is separated from the ground plane layer by a gap and is characterized by a location factor between 0.5 and 2, preferably between 0.5 and 1. The ground plane layer may be inscribed in ground plane rectangle 1306 (in dashed lines for illustrative purposes only), and the radiation booster may be inscribed in booster box 1305 (in dashed lines for illustrative purposes only).

A wireless electronic device comprising a slim radiating system that includes slim radiating structure 1300 may advantageously provide penta-band operation: two frequency bands in the first frequency region, like for example the frequency bands corresponding to the GSM 850 and GSM 900 cellular communication standards (i.e. the first frequency region comprising the 824 MHz to 960 MHz frequency range), and three frequency bands in the second frequency region, like for example the frequency bands corresponding to the GSM 1800, GSM 1900 and WCDMA 2100 cellular communication standards (i.e. the second frequency region comprising the 1710 MHz to 2170 MHz frequency range). In another example, a device according to the present invention could provide triple-band or quad-band operation with at least two frequency bands in the first frequency region, and at least another two frequency bands in the second frequency region, wherein first and second frequency regions do not overlap in frequency. Such device could operate, for instance but not limited to, the GSM 850 and GSM 900 cellular communication standards, and the GSM 1800 and GSM 1900 cellular communication standards.

Figure 14A:
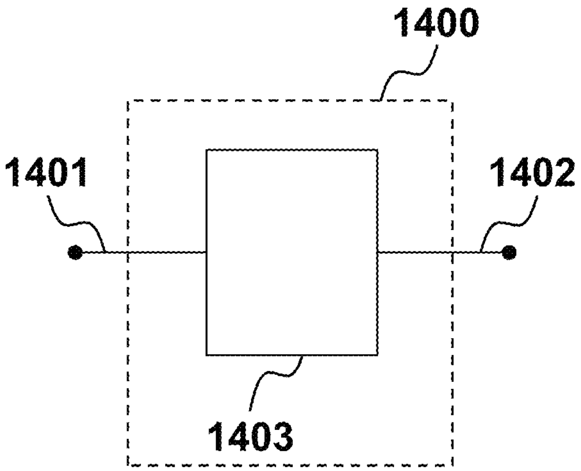
FIGS. 14A-14B—Show schematic representations of radio-frequency systems in accordance with a preferred embodiment.

FIG. 14A illustrates a radio-frequency system 1400 that comprises a first port 1401, a second port 1402, and a matching circuit 1403. Such radio-frequency system is particularly convenient to be used in the slim radiating system of FIG. 2A. Port 1401 may be connected to an internal conductive path (for instance 204*a*), and port 1402 may be connected to an external conductive path (for instance 205*a*). The matching circuit 1403 may be configured to provide impedance matching in at least one frequency region, or in at least two frequency regions, or in at least three frequency regions.

Figure 14B:
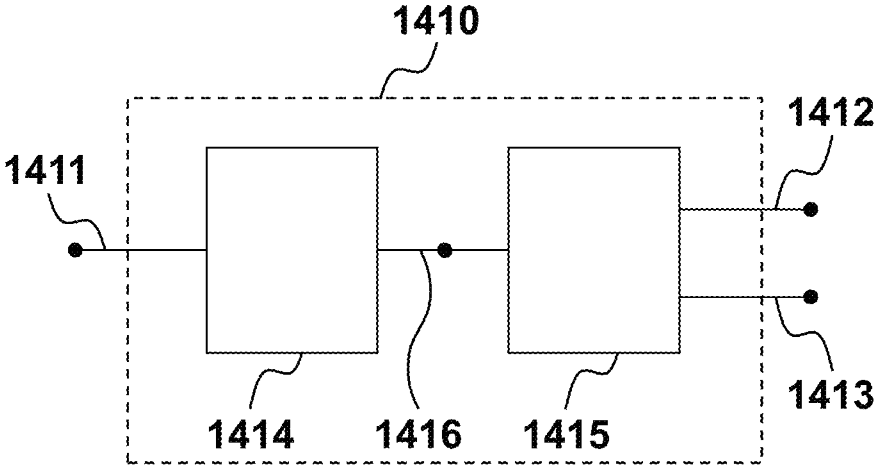

FIG. 14B illustrates another radio-frequency system 1410 comprising a first port 1411, a second port 1412, a third port 1413, a matching circuit 1414, a diplexer 1415, and a conductive path 1416 connecting the matching circuit to the diplexer. In reception, the diplexer 1415 is configured to split the signal from conductive path 1416 in a first signal extracted at port 1412, preferably comprising the frequencies corresponding to the first frequency region, and in a second signal extracted at port 1413, preferably comprising the frequencies corresponding to the second frequency region; in transmission, diplexer 1415 combines signals from ports 1412 and 1413 and are extracted in conductive path 1416. The matching circuit 1414 provides impedance matching to the slim radiating system in the first and second frequency regions. Ports 1412 and 1413 may be respectively connected to first and second external paths as shown in FIG. 2D.

FIGS. 15A to 15F show preferred matching circuits configured to provide impedance matching in at least two frequency regions.

Figure 15A:
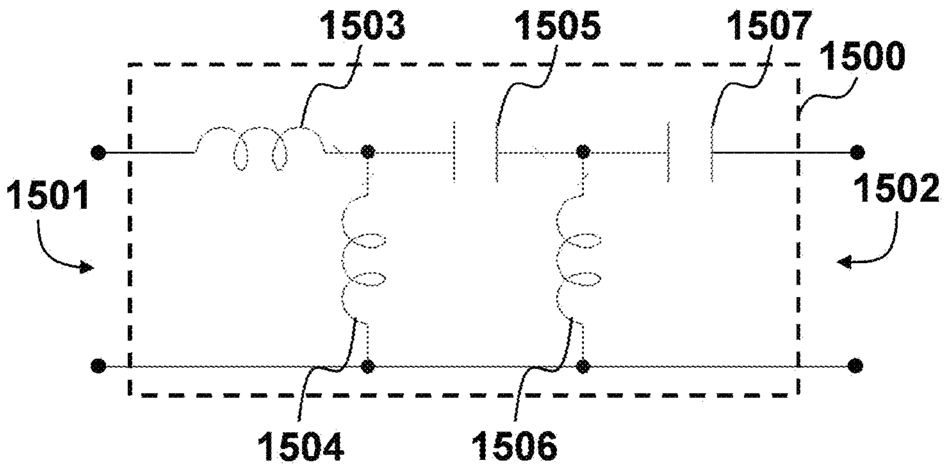
FIGS. 15A-15F—Show six preferred matching circuits for some embodiments of the present invention.

FIG. 15A shows matching circuit 1500 comprising first and second ports 1501 and 1502, and a circuit including five stages forming a ladder topology (series-parallel-series-parallel-series). The first stage, which is connected to port 1501, is an inductor in series 1503, the second stage is a shunted inductor 1504, the third stage is a capacitor in series 1505, the fourth stage is an inductor in parallel 1506, and the fifth stage is a capacitor in series 1507, said fifth stage being connected to the second port 1502.

Figure 15B:
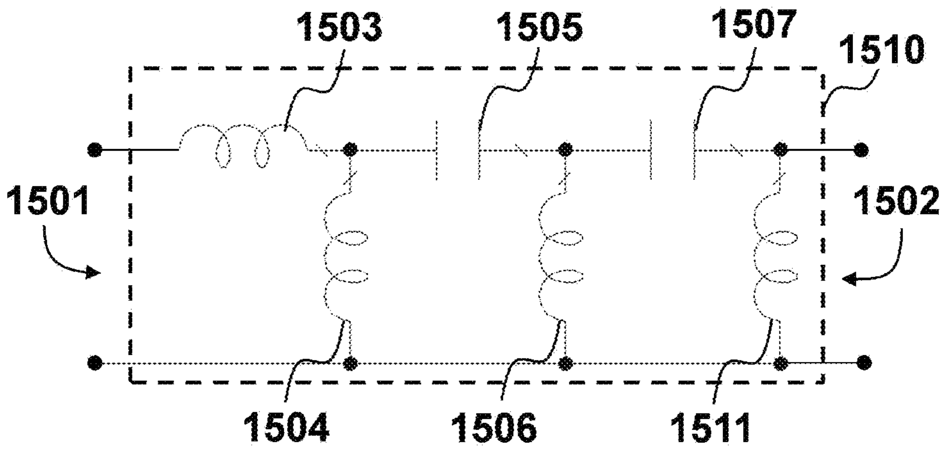

In FIG. 15B there is shown matching circuit 1510 comprising six stages that form an alternative ladder topology (series-parallel-series-parallel-series-parallel). The first stage (in series) is connected to the first port 1501 of the matching circuit, and the sixth stage comprising an inductor in parallel 1511 is connected to the second port 1502 of the matching circuit.

Figure 15C:
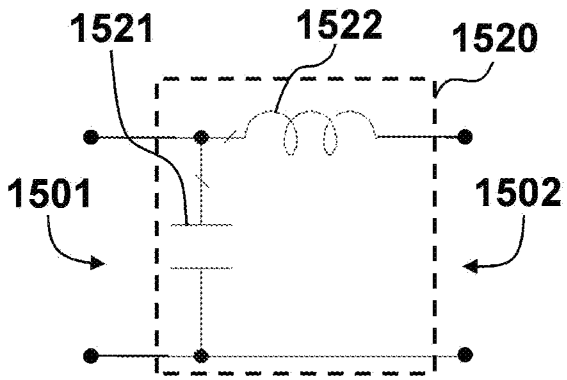

FIG. 15C depicts another preferred matching circuit 1520 comprising two stages: the first stage comprises a capacitor in parallel 1521, and the second stage comprises an inductor in series 1522. A preferred range of capacitor values for shunted capacitor 1521 of matching circuit 1520 is 0.01 pF to 30 pF.

Figure 15D:
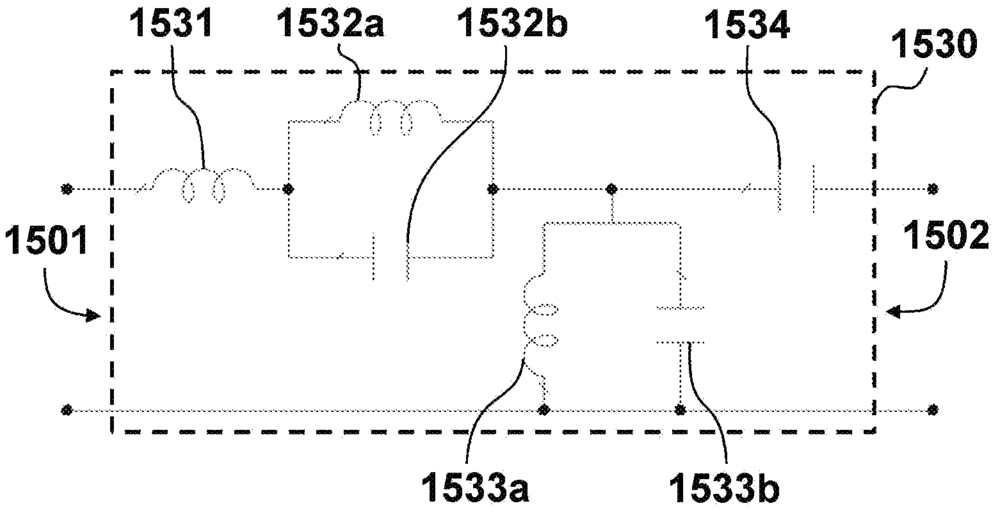

FIG. 15D shows another preferred matching circuit 1530 comprising a series inductor 1531 connected to port 1501 and to a series LC resonator formed by inductive component 1532*a* and capacitive component 1532*b*. The LC resonator is connected to an LC resonator in parallel, comprising inductor 1533*a* and capacitor 1533*b*, and to a series capacitor 1534. The series capacitor is connected to second port 1502 of the matching circuit 1530. This matching circuit comprises a single branch formed by four stages (series-series-parallel-series).

Figure 15E:
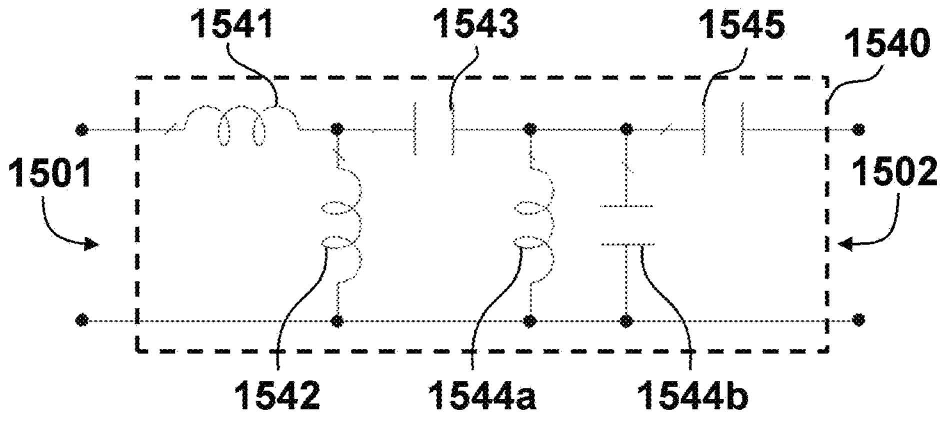

FIG. 15E shows a fifth preferred matching circuit 1540 comprising: inductor 1541 in series connected to port 1501, inductor 1542 in parallel, capacitor 1543 in series, inductor 1544*a* and capacitor 1544*b* in parallel forming a parallel LC circuit, and capacitor 1545 in series connected to port 1502.

Figure 15F:
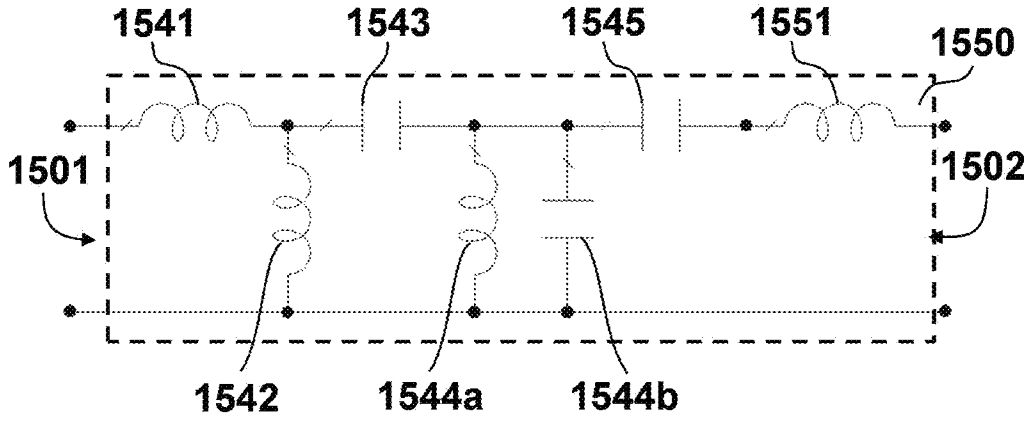

FIG. 15F illustrates another preferred matching circuit 1550 that is similar to matching circuit 1540 with the difference that capacitor 1545 is connected to inductor in series 1551 forming a series LC circuit, and said inductor being connected to port 1502 instead of capacitor 1545 as in FIG. 15E.

Inductors 1503, 1531 and 1541 corresponding to the first stage of matching circuits 1500, 1510, 1530, 1540 and 1550 may preferably have a value in the range of 0.1 nH to 80 nH.

Matching circuits 1500, 1510, 1520, 1530, 1540, and 1550 are suitable for being used as matching circuit 203*a* and 203*d* shown in FIGS. 2A and 2D.

Figure 16A:
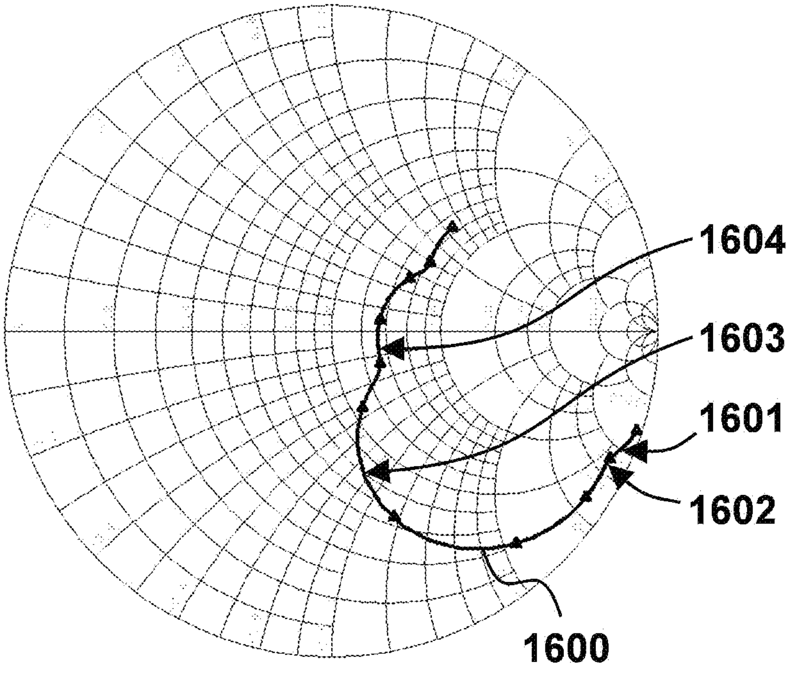
FIGS. 16A-16F—Show the impedance transformation of an exemplary slim radiating system as the different stages of a matching circuit in the radio-frequency system are added.

FIG. 16A shows the impedance 1600 of a slim radiating system comprising a radiation booster, measured at its internal conductive path, when it is disconnected from a radio-frequency system as disclosed in the present invention. Points 1601 and 1602 from said impedance correspond to the lowest and highest frequencies of a first frequency region (in this example, said frequencies are 824 MHz and 960 MHz); and points 1603 and 1604 correspond to the lowest and highest frequencies of a second frequency region (for this particular example, said frequencies are 1710 MHz and 2170 MHz). The impedance 1600 has a substantially large negative reactance, namely the impedance in the first frequency region is capacitive, for the entire range of frequencies limited by points 1601 and 1602, and is also capacitive for the frequencies of the second frequency region. The first resonant frequency of said slim radiating structure is at a frequency above the highest frequency of the second frequency region (as indicated by point 1604).

Figure 16B:
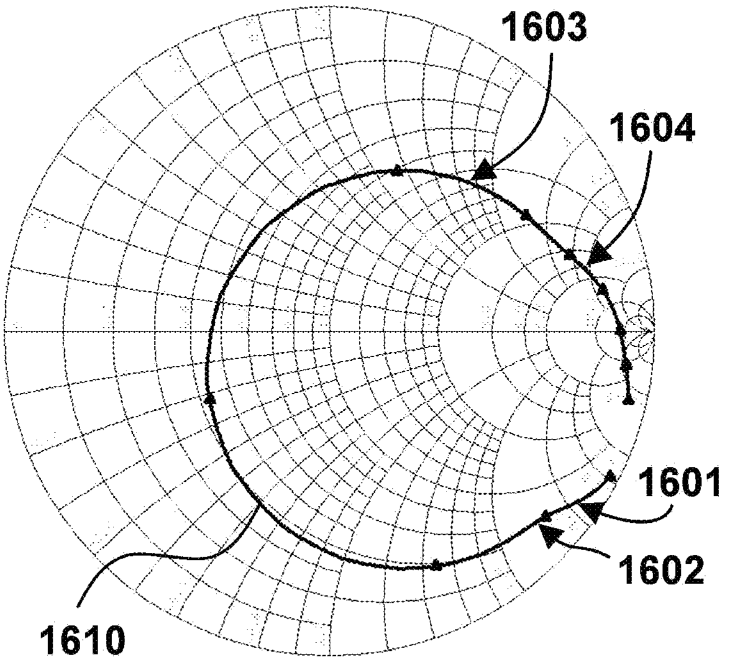
Figure 16C:
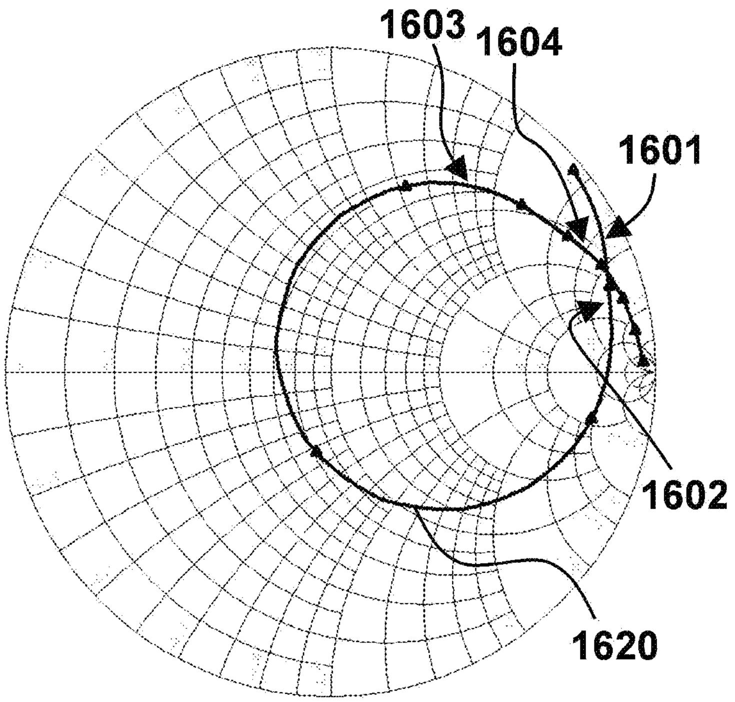
Figure 16D:
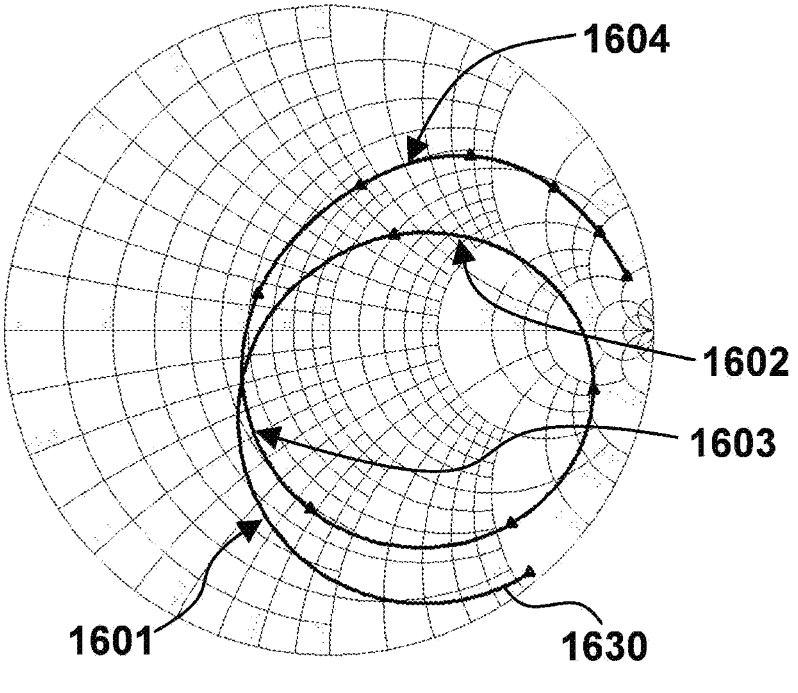
Figure 16E:
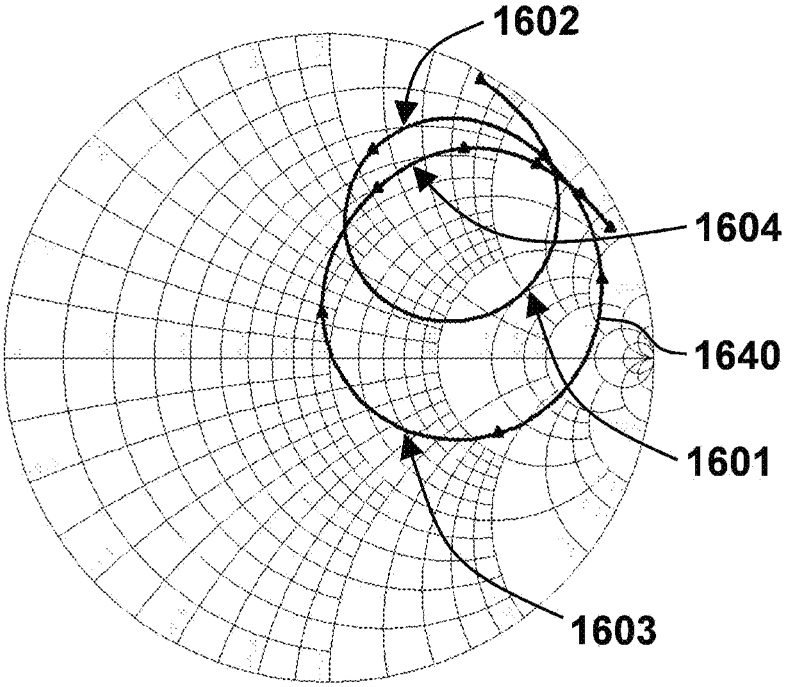
Figure 16F:
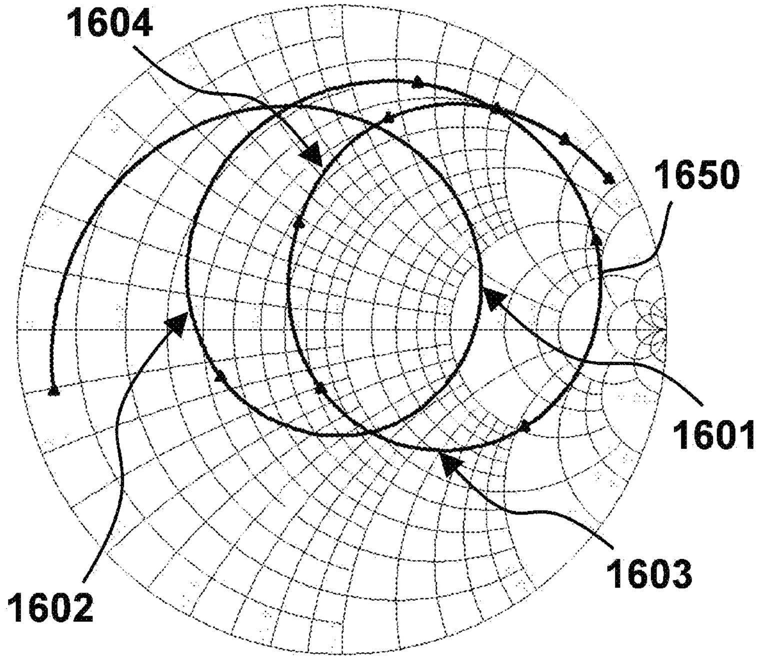
Figure 17:
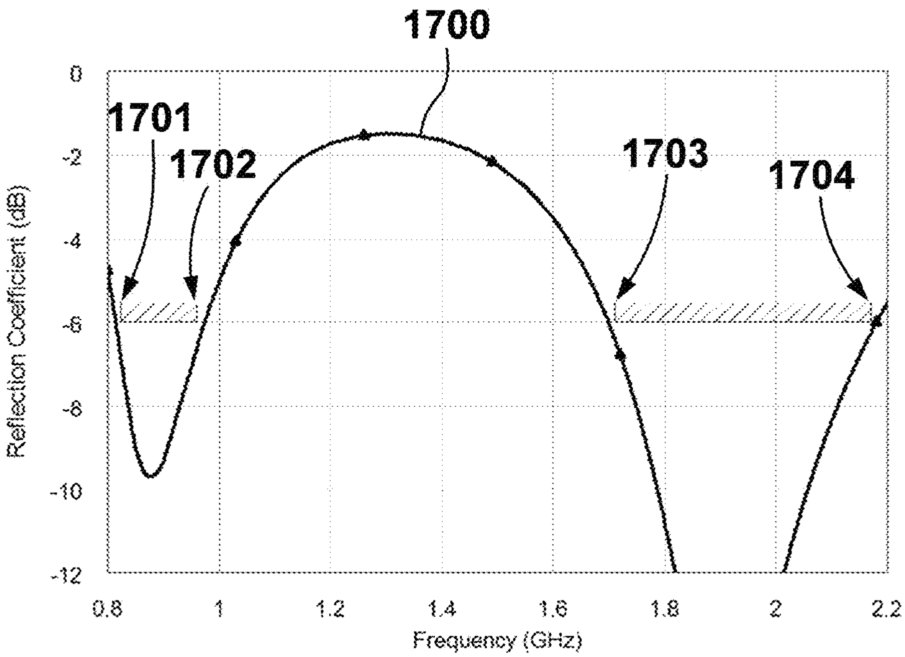
FIG. 17—Shows the reflection coefficient of exemplary slim radiating system of FIG. 16F.

FIGS. 16B to 16F show the evolution of the impedance of slim radiating system of FIG. 16A after the slim radiating system is connected to a radio-frequency system comprising a matching circuit like 1500 as the stages are added successively to the matching circuit. FIG. 16B shows the impedance 1610 when the matching circuit only comprises the first stage (an inductor in series). In FIG. 16C, the impedance 1620 of the slim radiating system is shown after adding the inductor in parallel (corresponding to the second stage) to the matching circuit. The impedance 1630 from FIG. 16D is obtained after the series capacitor from the third stage is added. The impedance 1640 from FIG. 16E is obtained after the shunted inductor from the fourth stage is added. And with the addition of the fifth stage corresponding to another capacitor in series, the impedance 1650 of the slim radiating system is obtained. In addition to the impedance 1650 as shown in FIG. 16F, the reflection coefficient 1700, when the slim radiating structure is connected to a radio-frequency system comprising the five-stage ladder matching network is also shown in FIG. 17. In this particular example, the operating frequency range for the radiating system covers a first frequency region at least comprising the range of frequencies delimited by points 1701 and 1702 (824 MHz and 960 MHz respectively), and a second frequency region at least comprising the range of frequencies delimited by points 1703 and 1704 (1710 MHz and 2170 MHz respectively), wherein said points establish a minimum level of reflection coefficient for a good radio-frequency performance for this particular example, although in other embodiments said minimum level could be, for example, −4.4 dB.

A ratio between the lowest frequency of the second frequency region and the lowest frequency of the first frequency region is, for this particular case, greater than 1.5 and even greater than 2.0. In addition, a ratio between the first resonant frequency of the slim radiating structure measured at an internal path, when disconnected from the radio-frequency system, and the lowest frequency of the first frequency region is greater than 1.3, also greater than 2.0, and even greater than 2.4.

Figure 18A:
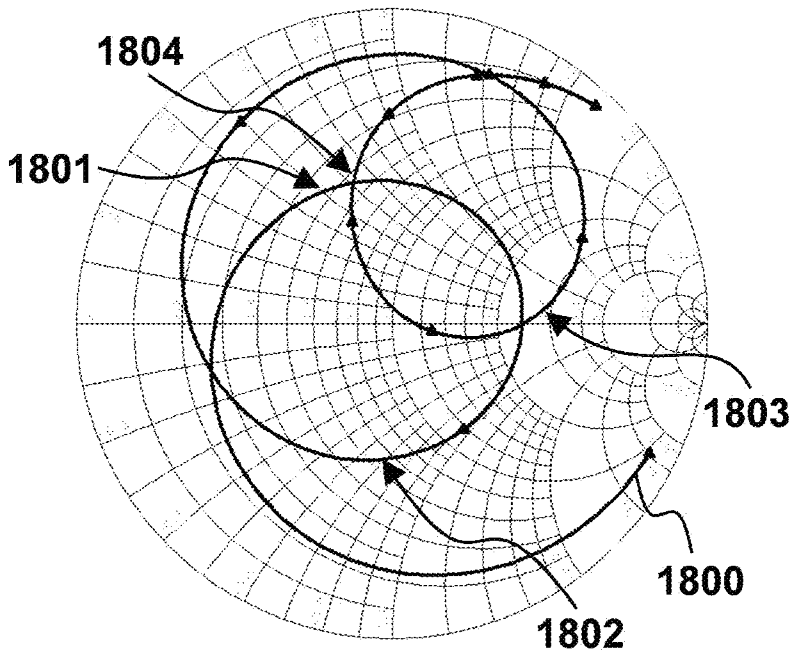
FIG. 18A-18B—Show the impedance and the reflection coefficient of an exemplary slim radiating system comprising a radio-frequency system according to the invention.
Figure 18B:
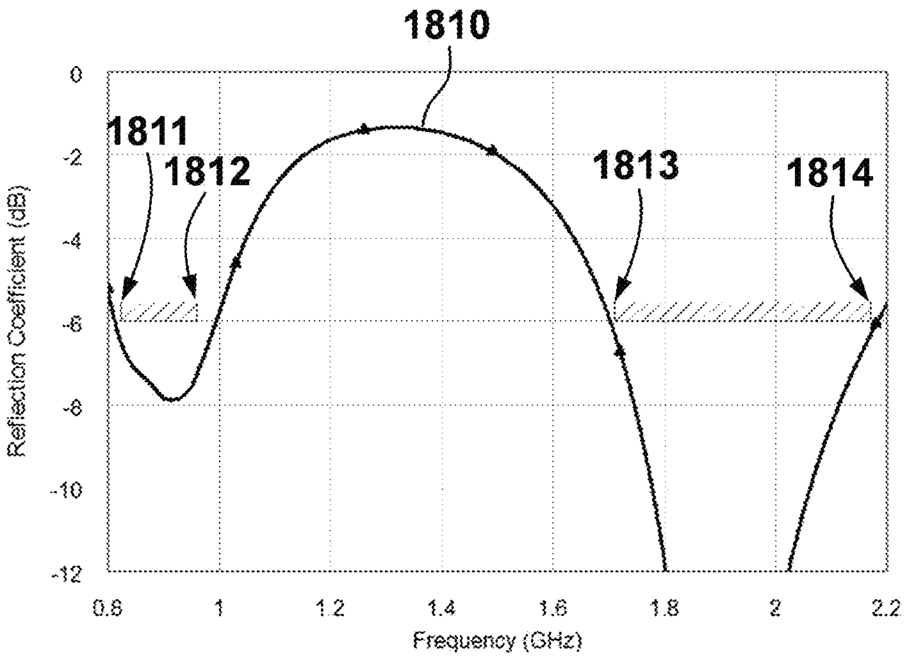

FIGS. 18A and 18B show the impedance and reflection coefficient of another exemplary embodiment. Such embodiment corresponds to a slim radiating system comprising a slim radiating structure featuring an impedance similar to that of FIG. 16A, and a radio-frequency system according to the present invention. The radio-frequency system comprises a six-stage matching circuit in a ladder topology, like for example matching circuit 1510 from FIG. 15B. The impedance 1800, when the slim radiating structure is connected to such radio-frequency system, is shown in FIG. 18A. In said figure, points 1801 and 1802 refer to the lower and higher frequencies of a first frequency region (824 MHz and 960 MHz respectively), and points 1803 and 1804 refer to the lower and higher frequencies of a second frequency region (1710 MHz and 2170 MHz respectively). The reflection coefficient 1810 of FIG. 18B corresponds to the slim radiating system of FIG. 18A. The operating frequency range for a slim radiating system according to this particular embodiment at least covers a first frequency region including the first range delimited by points 1811 and 1812 (824

MHz and 960 MHz), and a second frequency region including the second range delimited by points 1813 and 1814 (1710 MHz and 2170 MHz).

Figure 19:
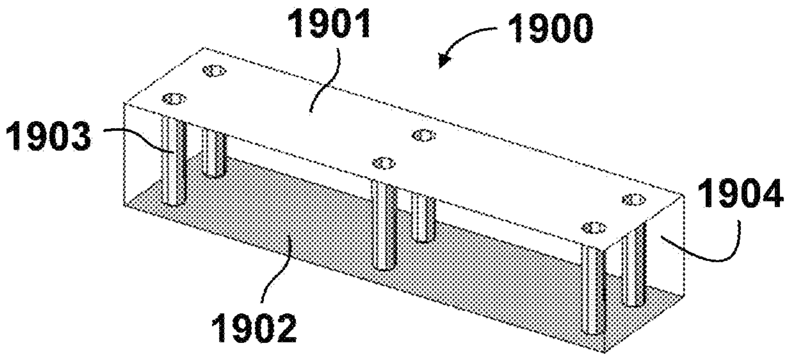
FIG. 19—Shows an exemplary radiation booster according to the invention.

FIG. 19 shows a radiation booster 1900 comprising conducting surfaces 1901 and 1902, a dielectric material 1904 (shown transparent for illustrative purposes only), and a plurality of vias 1903 electrically interconnecting the two conducting surfaces 1901 and 1902 (in other examples, said conducting surfaces may be interconnected by just one via). Said radiation booster is a booster bar featuring a slim width factor of 3.125, and a slim height factor of 3.125. The booster bar 1900 may be used, for example, in slim radiating structure 1300 instead of radiation booster 1301.

A booster bar such as 1900 is configured to be used in slim radiating systems according to the present invention, and in particular in each and every embodiment of the present invention. As such, a slim radiating system comprising a slim radiating structure, a radio-frequency system and at least one external conductive path, wherein the slim radiating structure comprises a radiation booster like, for example, 1900 and a ground plane layer, may be configured to transmit and receive electromagnetic wave signals in at least one frequency region, or in at least two frequency regions. The radio-frequency system comprises a matching circuit configured to provide impedance matching to the slim radiating system in said at least one or at least two frequency regions at the at least one external path.

Figure 20:
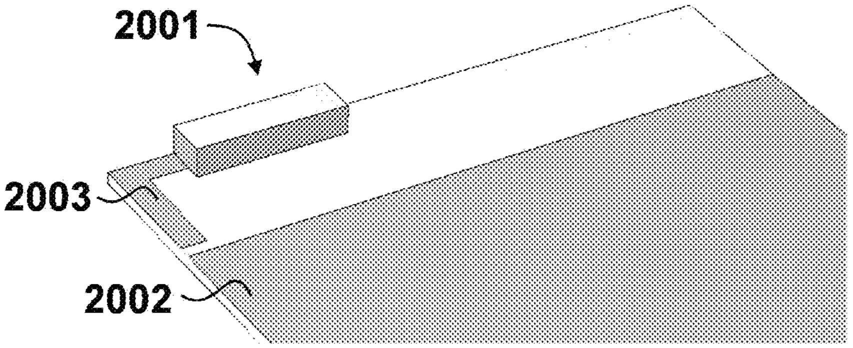
FIG. 20—Shows a slim radiating structure and an internal path in the form of a conductive trace in accordance with a preferred embodiment.

FIG. 20 shows a slim radiating structure comprising a radiation booster (e.g. booster bar) 2001, a ground plane layer 2002. There is also shown a conductive element 2003 that may advantageously function as an internal conductive path. The conductive element 2003 is connected to radiation booster 2001, advantageously tuning the input impedance of the radiation booster prior its connection to a radio-frequency system (not shown). The conductive element may improve the efficiency of the slim radiating system comprising said slim radiating structure, or make the slim radiating system operable in more frequency bands in at least one frequency regions or in at least two frequency regions. In this example, the booster bar features a height of 2.4 mm, a slim width factor of 4, a slim height factor of 5, and a location factor of 0.33. Although the conductive element 2003 is L-shaped, in other examples the conductive element may take other forms as well such as a straight I.

The electrical length of conductive element 2003 may be shorter than 10% of the free-space wavelength corresponding to the lowest frequency of the first frequency region, and preferably it may be shorter than 5% of said free-space wavelength.

Figure 21A:
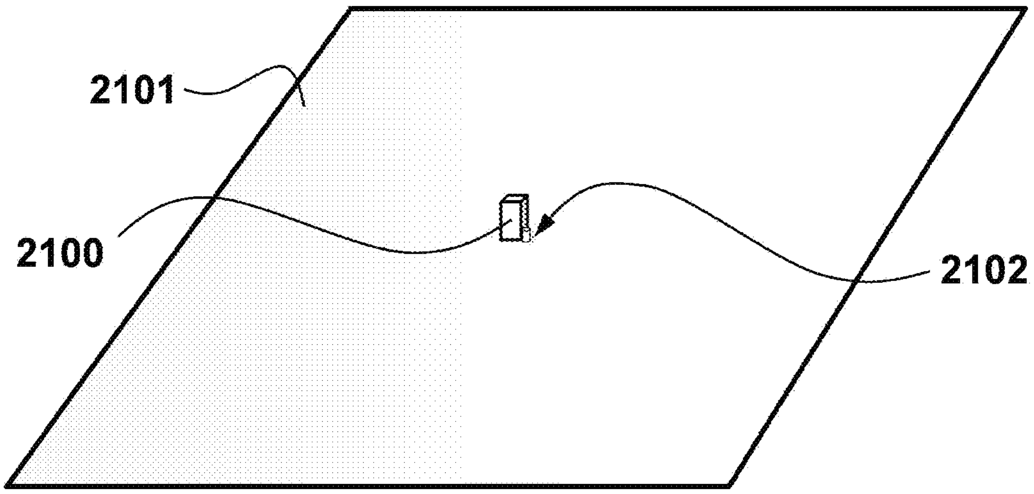
FIG. 21A-21B—Show a test platform for the electromagnetic characterization of radiation boosters.

FIG. 21A schematically shows, in a 3D perspective, a test platform for the characterization of radiation boosters. The platform comprises substantially square conductive surface 2101 and connector 2102 (for instance an SMA connector) electrically connected to the device or element 2100 to be characterized. The conductive surface 2101 has sides with a length larger than the reference operating wavelength corresponding to the reference frequency. For instance, at 900 MHz, said sides are at least 60 centimeters long. The conductive surface may be a sheet or plate made of copper, for example. The connector 2102 is placed substantially in the center of conductive surface 2101.

Figure 21B:
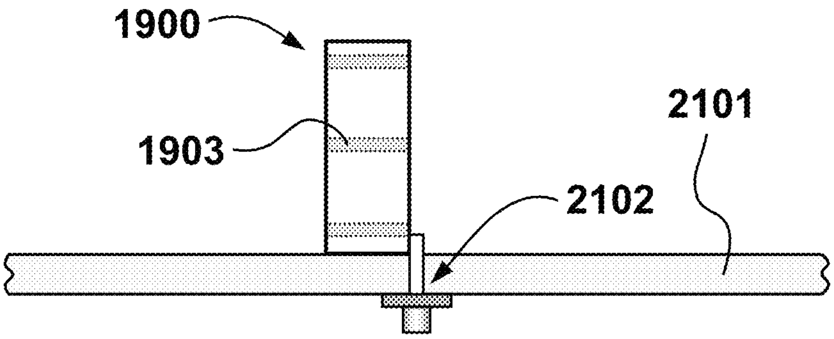

In FIG. 21B the same test platform of FIG. 21A is schematically represented in a 2D perspective wherein the conductive surface 2101 is partially drawn. In this example, the element that is to be characterized 2100 in FIG. 21A corresponds to booster bar 1900 from FIG. 19, which is arranged so that its largest dimension is perpendicular to conductive surface 2101, and one of the first or second conductive surfaces (1901 or 1902 of FIG. 19) is in direct electrical contact with connector 2102 (for clearer interpretation of the orientation of radiation booster 1900, via holes 1903 connecting the first and second conductive surfaces of the radiation booster are also drawn in FIG. 21B). The radiation booster 1900 lies on a dielectric material (not shown) attached to the conductive surface 2101 so as to minimize the distance between radiation booster 1900 and surface 2101. Said dielectric material may be a dielectric tape or coating, for example.

Figure 22:
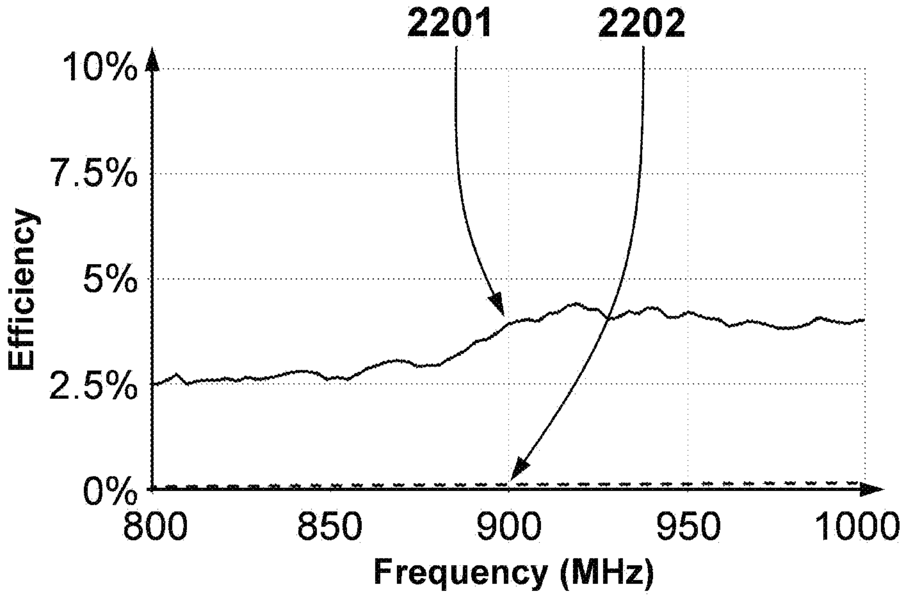
FIG. 22—Shows the radiation efficiency and antenna efficiency of a radiation booster according to the present invention measured with the test platform depicted in FIGS. 21A and 21B.

FIG. 22 shows a graph of the radiation efficiency and antenna efficiency measured in a test platform like the one shown in FIG. 21A and FIG. 21B, when the element 2100 to be characterized is radiation booster 1900. In this particular example, the radiation efficiency measured 2201 (represented with a solid line) at 900 MHz is less than 5%, and the antenna efficiency measured 2202 (represented with a dashed line) at 900 MHz is less than 1%.

The foregoing is merely illustrative of the principles of this invention and various modifications can be made by those skilled in the art without departing from the scope and spirit of the invention. So even though that in the illustrative examples described above in connection with the figures some particular designs of booster bars with specific values for the slim width factor, the slim height factor, and the location factor have been used, many other designs of boosters bars in accordance with the invention having for example different slim width factor, slim height factor, and/or location factor could have been equally used in the slim radiating structures.

What is claimed is:

1. A radiation booster bar comprising:

first and second substantially parallel conductive surfaces;

a dielectric material that supports the first and second conductive surfaces;

wherein the radiation booster bar has a slim width factor greater than 2, the slim width factor being a ratio between a length and a width of the radiation booster bar;

wherein the first and second conductive surfaces are connected at two opposite ends of a longest edge of the first or second conductive surface so that a first resonant frequency of the radiation booster bar is higher than a highest frequency of a first frequency region of operation of the radiation booster bar; and wherein the radiation booster bar is not resonant within any frequency range of operation of the radiation booster bar.

2. The radiation booster bar of claim 1, wherein the dielectric material is air.

3. The radiation booster bar of claim 1, wherein the first and second conductive surfaces are connected by at least one via.

4. The radiation booster bar of claim 3, wherein the first and second conductive surfaces are connected at each end of an edge of the first conductive surface by two vias.

5. The radiation booster bar of claim 3, wherein the radiation booster bar comprises four vias, one at each corner of the first conductive surface, and wherein the radiation booster bar has a rectangular shape and the first and second conductive surfaces are substantially the same size.

6. The radiation booster bar of claim 1, wherein:

the radiation booster bar has a first resonance frequency greater than 3.0 times a reference frequency of 900 MHz, when connected to a test platform comprising a square conductive surface acting as ground plane and having sides measuring 60 centimeters, the radiation booster bar being mounted close to a central point of the first conductive surface and extending perpendicularly from the first conductive surface in a monopole configuration, and being electrically connected to a connector; and a radiation efficiency measured for the radiation booster bar in the test platform at the reference frequency of 900 MHz is less than 10%.

7. The radiation booster bar of claim 6, wherein the radiation efficiency measured for the radiation booster bar in the test platform at the reference frequency of 900 MHz is less than 2.5%.

8. A radiation booster bar comprising:

first and second substantially parallel conductive surfaces;

a dielectric material that supports the first and second conductive surfaces;

wherein the radiation booster bar has a slim width factor greater than 2, the slim width factor being a ratio between a length and a width of the radiation booster bar;

wherein the first and second conductive surfaces are connected substantially in the middle of two opposite edges of the first or second conductive surface such that a first resonant frequency of the radiation booster bar is higher than a highest frequency of a first frequency region of operation of the radiation booster; and wherein the radiation booster bar is not resonant within any frequency range of operation of the radiation booster bar.

9. The radiation booster bar of claim 8, wherein the first and second conductive surfaces are connected substantially in the middle of the two opposite edges of the first or second conductive surface by at least one via.

10. The radiation booster bar of claim 9, wherein the first and second conductive surfaces are also connected at both ends of an edge of the first or second conductive surface.

11. The radiation booster bar of claim 8, further comprising two vias between the first and second conductive surfaces.

12. The radiation booster bar of claim 11, wherein the radiation booster bar comprises one via at each corner of the first conductive surface, and wherein the radiation booster bar has a rectangular shape and the first and second conductive surfaces are substantially the same size.

13. The radiation booster bar of claim 8, wherein the first and second conductive surfaces are also connected at both ends of an edge of the first or second conductive surface.

14. The radiation booster bar of claim 13, wherein the first and second conductive surfaces are connected at each end of an edge of the first conductive surface by at least one via.

15. The radiation booster bar of claim 13, further comprising first and second vias between the first and second conductive surfaces at two ends of an edge of the first conductive surface.

16. The radiation booster bar of claim 8, wherein:

the radiation booster bar has a first resonance frequency greater than 3.0 times a reference frequency of 900 MHZ, when connected to a test platform comprising a square conductive surface acting as ground plane and having sides measuring 60 centimeters, the radiation booster bar being mounted close to a central point of the first conductive surface and extending perpendicularly from the first conductive surface in a monopole configuration, and being electrically connected to a connector; and a radiation efficiency measured for the radiation booster bar in the test platform at the reference frequency of 900 MHz is less than 10%.

17. The radiation booster bar of claim 16, wherein the radiation efficiency measured for the radiation booster bar in the test platform at the reference frequency of 900 MHz is less than 2.5%.

18. A radiation booster bar comprising:

first and second substantially parallel conductive surfaces connected by at least one via;

a dielectric material that supports the first and second conductive surfaces;

wherein the radiation booster bar has a slim height factor greater than 3, the slim height factor being a ratio between a length and a height of the radiation booster bar;

wherein the radiation booster bar has a maximum size smaller than 1/15 of the free-space wavelength corresponding to a lowest frequency of a first frequency region of operation; and wherein the radiation booster bar is not resonant within any frequency range of operation of the radiation booster bar.

19. The radiation booster bar of claim 18, wherein the radiation booster bar has a maximum size smaller than 1/25 of the free-space wavelength corresponding to the lowest frequency of the first frequency region of operation.

* * * * *